United States Patent
Ball

(10) Patent No.: US 12,003,429 B2
(45) Date of Patent: Jun. 4, 2024

(54) DUAL USER SPACE-KERNEL SPACE DATAPATHS FOR PACKET PROCESSING OPERATIONS

(71) Applicant: Juniper Networks, Inc., Sunnyvale, CA (US)

(72) Inventor: Darrell Ball, Livermore, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 169 days.

(21) Appl. No.: 17/446,145

(22) Filed: Aug. 26, 2021

(65) Prior Publication Data

US 2023/0066013 A1  Mar. 2, 2023

(51) Int. Cl.
*H04L 49/25* (2022.01)
*G06F 9/54* (2006.01)
*H04L 49/15* (2022.01)

(52) U.S. Cl.
CPC ............ *H04L 49/25* (2013.01); *G06F 9/545* (2013.01); *H04L 49/15* (2013.01)

(58) Field of Classification Search
CPC ..... H04L 49/25; H04L 49/15; H04L 63/0227; G06F 9/545; G06F 21/53; G06F 9/45558; G06F 21/606; G06F 2009/45595
See application file for complete search history.

(56) References Cited

U.S. PATENT DOCUMENTS

| | | | | |
|---|---|---|---|---|
| 9,641,435 B1* | 5/2017 | Sivaramakrishnan | | H04L 69/166 |
| 2016/0359681 A1* | 12/2016 | McGleenon | ............ | H04L 41/12 |
| 2019/0140983 A1* | 5/2019 | Tu | ............ | H04L 69/22 |
| 2021/0352044 A1* | 11/2021 | Asveren | ............ | H04L 61/2525 |
| 2022/0103530 A1* | 3/2022 | Daly | ............ | H04L 63/166 |

OTHER PUBLICATIONS

Tu et al. Accelerating Virtual Network Functions With Fast-Slow Path Architecture Using eXpress Data Path, IEEE Transactions on Network and Service Management, vol. 17, No. 3, Sep. 2020 (Year: 2020).*

(Continued)

*Primary Examiner* — Ayaz R Sheikh
*Assistant Examiner* — David Zhijun Sun
(74) *Attorney, Agent, or Firm* — Shumaker & Sieffert, P.A.

(57) ABSTRACT

In general, techniques are described for enhancing packet processing in a computing device of a network. The computing device is configured to in response to receiving ingress data of a flow from the first network device via the first network interface, execute, based on a hook point in kernel space of the device, a kernel program to transfer, via a first socket of a user module, the ingress data for packet processing; configure an code point for the second network interface, wherein the user module is configured to couple a second socket with the code point; and in response to determining the second network device as a next hop for the flow, transfer, based on the code point, egress data of the flow via the second socket to the second network interface, wherein the second network interface is operative to output the egress data to the second network device.

18 Claims, 7 Drawing Sheets

(56) References Cited

OTHER PUBLICATIONS

Anonymous et al. "BPF and XDP Reference Guide", Cilium, Aug. 2021, Internet URL https://web.archive.org/web/20210809004057/http://docs.cilium.io/en/latest/bpf/ (Year: 2021).*

Anonymous et al., "BPF and XDP Reference Guide", Cilium, Aug. 2021, 96 pp., Retrieved from the Internet on Dec. 12, 2022 from URL: https://web.archive.org/web/20210809004057/https://docs.cilium.io/en/latest/bpf/.

Anonymous, "Introduction", Cilium, Apr. 2021, 3 pp., Retrieved from the Internet on Dec. 12, 2022 from URL: https://web.archive.org/web/20210417113705/https://docs.cilium.io/en/latest/concepts/ebpf/intro/.

Anonymous, "Life of a Packet", Cilium, Apr. 2021, 2 pp., Retrieved from the Internet on Dec. 12, 2022 from URL: https://web.archive.org/web/20210417121721/https:/docs.cilium.io/en/latest/concepts/ebpf/lifeofapacket/.

Extended Search Report from counterpart European Application No. 22191518.4 dated Dec. 21, 2022, 13 pp.

Hopps, "Analysis of an Equal-Cost Multi-Path Algorithm," RFC 2992, Network Working Group, Nov. 2000, 8 pp.

Response to Extended Search Report dated Dec. 21, 2022, from counterpart European Application No. 22191518.4 filed Sep. 1, 2023, 24 pp.

\* cited by examiner

DUAL USER SPACE-KERNEL SPACE DATAPATHS FOR PACKET PROCESSING OPERATIONS

TECHNICAL FIELD

Techniques of this disclosure relate generally to computer networks and more particularly to packet processing in a network.

BACKGROUND

A computer network is a collection of interconnected computing devices that can exchange data and share resources. In a packet-based network, such as an Ethernet network, the computing devices communicate data by dividing the data into small blocks called packets, which are individually routed across the network from a source device to a destination device. The destination device extracts the data from the packets and assembles the data into its original form. Intermediate devices (referred to as network devices or nodes) are interconnected so as to provide an infrastructure for forwarding the packets between computing devices. For example, computer networks may include routers, switches, gateways, firewalls and a variety of other network devices.

At a network device, an operating system implements a number of components/features that configure hardware/software resources within the network device to operate as a router, a switch, a gateway, or the like. The operating system configures hardware components for routing and forwarding of the packets, for example, by invoking a number of routing protocols. There are instances when the network device must rely upon the operating system to configure the network device for the routing and forwarding of the packets.

In a large-scale computer network, such as a typical cloud data center environment, there is a large collection of interconnected servers that provide computing and/or storage capacity to run various applications. For example, a data center may comprise a facility that hosts applications and services for subscribers, i.e., customers of data center. The data center may, for example, host all the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

Virtualized networks are becoming a core foundation of the modern information technology (IT) infrastructure. For example, modern data centers have extensively utilized virtualized environments in which virtual hosts, also referred to herein as virtual execution elements, such virtual machines or containers, are deployed and executed on an underlying compute platform of physical computing devices. Several advantages can be realized by employing virtualization within a computer network, resulting in an increased return on investment (ROI), including significant improvements to efficiency and significant control over the computing infrastructure.

SUMMARY

In general, techniques are described for enhancing operations of a network device in a computer network. Implementing the techniques described herein enable the network device to operate with enhanced native functionality or new functionality as an improvement over previous network device operation. The present disclosure also introduces device components, in hardware and/or software, to perform tasks (according to some techniques) to enhance packet processing operations in network devices. Some techniques are directed to enhanced packet processing operations in network devices that provide access to physical networks and/or virtual networks.

As described herein, (e.g., operating systems of) computing devices generally prioritize the kernel space over the user space in terms of resource allocation, control, security (e.g., access rights), and so forth, protecting any memory area therein (e.g., for storing computer data or software code) with more restrictions than lower priority memory areas. Network devices may avail the kernel space for software programs or hardware units performing packet processing operations, making advantageous use of the above restrictions to maintain a certain level of data security and integrity. On the other hand, because of the priority given the kernel space, there are fewer available software programs to execute and run; moreover, certain software programs may be desirable for achieving enhanced packet processing but are not designed to run on the kernel space. Latencies in the kernel space datapath may manifest in proportion to the consumed time and resources from protecting the kernel space and complying with the prioritization of the operating system.

However, without implementing the user space datapath, the network devices are limited with respect to which features the network devices may avail. Network devices that restrict packet processing to the kernel space datapath cannot take advantage of software and hardware capabilities that are only accessible from user space. It should be noted that "user datapath" and "kernel datapath" are interchangeable with user space datapath and kernel space datapath, respectively, in the following description. To provide access to these capabilities, the techniques described herein leverage a hook point in kernel space to introduce a kernel program for placing network traffic onto the user datapath. The user datapath may be described as a pipeline of software code programs configured to perform a number of packet processing operations. Some techniques may configure the pipeline with access to both user space functionality (e.g., network security applications) and kernel space networking infrastructure functionality (e.g., network functions).

Some techniques utilize the user datapath to perform secure packet processing operations (e.g., routing and forwarding). As part of the user datapath, an application may be executed to run in user space to operate as a control program for handling the performance of the above routing and forwarding operations and a variety of other packet processing operations. In addition to (e.g., virtual) network functions (e.g., a network service), the user datapath may invoke functionality built from custom software code and/or a number of helper functions including, but not limited to, network security functions, hypervisor functions, among others. To realize the benefits and advantages of the techniques described herein, some network devices may improve their packet processing performance by configuring a datapath, primarily through user space, for incoming/outgoing packets to be routed/forwarded to a next hop, which is a network device operating in either a different network or a same network and, possibly, a final destination for the packet data. The user datapath may be instantiated by the network device in addition to or instead of a datapath in kernel space. Therefore, to improve a customer's network, for example, with enhanced network management, the customer may implement these techniques in the network infrastructure. In this manner, a network device in that customer network may be configured with the user datapath in order to benefit from functionality that may not found in an operating system networking stack and/or may not run in the kernel space.

In one example, a method for a computing device comprising at least two network interfaces communicatively coupled with at least two network devices, includes: configuring, in kernel space of a computing device, a hook point for a first network interface, wherein the hook point is configured to couple a kernel program with a first socket of a user module of the computing device, wherein the first network interface communicatively couples a first network device with the computing device; configuring, in the kernel space of the computing device, an code point for a second network interface, wherein the code point is configured to couple the kernel program with a second socket of the user module, wherein the second network interface communicatively couples a second network device with the computing device; in response to receiving ingress data of a flow from the first network device, executing, based on the hook point, the kernel program to transfer, via the first socket, the ingress data to the user module; and in response to determining the second network device as a next hop for the flow, transferring, based on the code point, egress data of the flow via the second socket to the second network interface, wherein the second network interface is operative to output the egress data to the second network device.

In one example, a computing device includes a first network interface communicatively coupled to a first network device; a second network interface communicatively coupled to a second network device; memory; and a processor connected to the memory and the network interface, wherein the memory includes instructions that, when executed by the processor, cause the processor to: in response to receiving ingress data of a flow from the first network device via the first network interface, execute, based on a hook point in kernel space of the device, a kernel program to transfer, via a first socket of a user module, the ingress data for packet processing; configure an code point for the second network interface, wherein the user module is configured to couple a second socket with the code point; and in response to determining the second network device as a next hop for the flow, transfer, based on the code point, egress data of the flow via the second socket to the second network interface, wherein the second network interface is operative to output the egress data to the second network device.

In another example, a network system includes: a switch fabric comprising a plurality of switches interconnected to form a physical network; a virtual network controller device configured to configure and manage one or more virtual networks within the physical network; and a plurality of servers interconnected by the switch fabric, wherein each of the servers comprises an operating environment executing one or more virtual machines in communication via virtual routing instances to the one or more virtual networks, wherein each server includes a host operating system (OS) executing in kernel space on the server, wherein a kernel program executes in kernel space and a user module executes in user space on each server in a virtual network stack connected to one or more of the virtual networks, wherein each pair of kernel program and user module is configured to extend the one or more virtual networks to the operating environments of the virtual machines, wherein the first server is configured to: configure, in the kernel space of a computing device, a hook point for a first network interface, wherein the kernel program is configured to couple the hook point with a first socket of a user module of the computing device, wherein the first network interface communicatively couples a first network device with the computing device; configure, in the kernel space of the computing device, an code point for a second network interface, wherein the user module is configured to couple the code point with a second socket of the user module, wherein the second network interface communicatively couples a second network device with the computing device; in response to receiving ingress data of a flow from the first network device, execute, based on the hook point, the kernel program to transfer, via the first socket, the ingress data to the user module; and in response to determining the second network device as a next hop for the ingress data, transfer, based on the code point, egress data of the flow via the second socket to the second network interface, wherein the second network interface is operative to output the egress data to the second network device.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Figure 1:
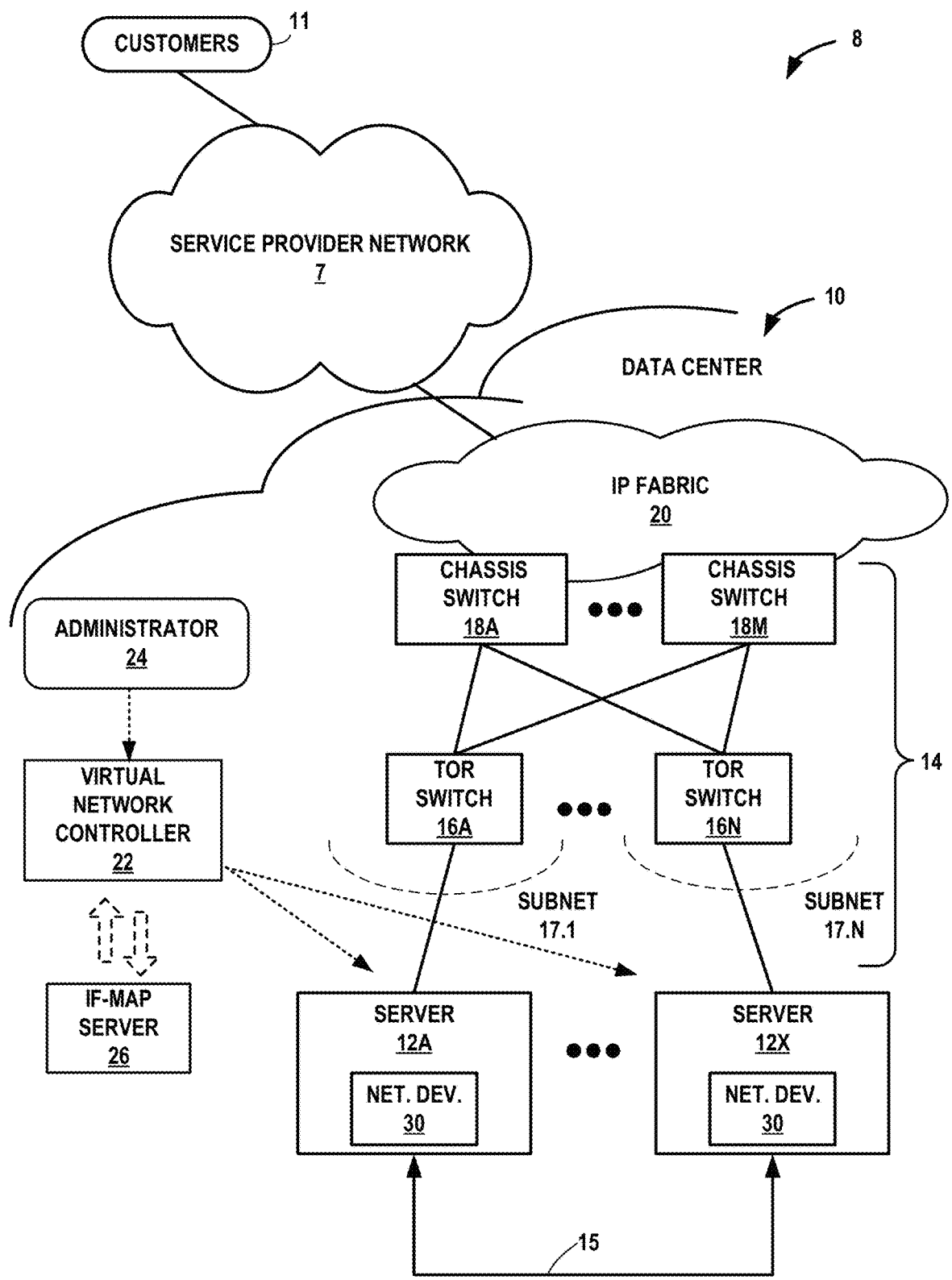
FIG. 1 is a block diagram illustrating an example network having a data center in which examples of the techniques described herein may be implemented.

The present disclosure describes a number of techniques for enhancing operations of a device of a computer network. Network devices operate as described herein and, generally, exchange data with each other within the same computer network or between different networks. For this exchange, appropriate device components (e.g., logical components, electromagnetic components, and/or the like) selected from compatible hardware/software for a number of applicable technologies (e.g., communication protocols) may be configured into any given network device. The appropriate device components perform necessary functionalities (e.g., to enable two or more network devices to exchange data in Protocol Data Units (PDUs) (e.g., packets). Mechanisms to secure operations by the above device components limit the capabilities of these device components by inhibiting expansion into new functionality and additional hardware/software and preventing or restricting availability of additional hardware/software. Some techniques of the present disclosure, while in compliance with these mechanisms, enhance operations by the above device components in a number of ways to the benefit of the computer network and its customers and owners.

One mechanism for protecting the components of the network device is the division of operations by the above device components between kernel space and user space. For a number of reasons, PDUs are processed along a datapath in the kernel space with limited (if any) interaction with application(s) in the user space. One device component, an operating system, creates at least one computing environment on which incoming packets are received as ingress data via an ingress network interface and then, processed by the kernel datapath (e.g., to identify its destination) and on which outgoing packets are generated from the ingress data with certain modified attributes and then, transmitted as egress data to the identified destination via an egress network interface.

The techniques of the present disclosure provide a second datapath through the user space and enable the operating system to direct PDUs to the second user datapath in a dual datapath implementation of the network device described herein. By employing these techniques, the above operating system may create a computing environment on which the ingress data is received and ultimately, processed by a user space application (e.g., to identify its destination) until transmission to the identified destination via the egress network interface. The operating system may configure one or both datapaths for PDU (e.g., packet) processing operations.

In one example, the operating system may execute, via processing circuitry, a first datapath, an Extended Berkeley Packet Filter (eBPF) eXpress DataPath (XDP) kernel datapath, and a second datapath, an Address-Family eXpress DataPath (AF_XDP) based user datapath, with a number of capabilities. A network device having the above operating system may benefit in a number of ways from implementing the AF_XDP-based user datapath for packet processing. AF_XDP and XDP technologies are highly reliable, efficient, and, as described herein, enable the operating system to bypass almost the entirety of the kernel datapath. The operating system may replace the eBPF XDP kernel datapath with the AF_XDP-based user datapath to avoid the typical latency or latencies associated with executing the eBPF XDP kernel datapath for packet processing.

To illustrate, on ingress, the eBPF XDP datapath in the kernel space may be executed in response to inbound packet reception and direct packets from the ingress network interface to AF_XDP sockets after some initial categorization and on egress, the AF_XDP-based user datapath may direct packets from the AF_XDP sockets to the egress network interface for outbound packet transmission. By doing so, these packets are not queued in the kernel space and avoid the latencies associated with such queuing.

As another benefit from executing the AF_XDP-based user datapath, the operating system may access additional functionality provided by one or more software programs in user space. One example of the AF_XDP-based user datapath includes software code of a user space networking stack. Another example AF_XDP-based user datapath may introduce the one or more software programs in addition to the software code of the networking stack. For instance, the operating system may execute a software program to generate an interface through which another program (e.g., a control program) invokes enhanced packet processing operations.

Combining the eBPF XDP kernel datapath with the AF_XDP based user datapath provides additional benefits and advantages; namely, reactive flow setup where the AF_XDP sockets communicate with the user space for first packets and eliminate the back and forth copying of packet data between the kernel space and the user space. As another benefit/advantage, handling packets in the dual datapath allows flows to be permanently or transiently marked such that the eBPF XDP datapath can be programmed to direct packets of these flows to the AF_XDP socket user datapath for processing.

Some examples techniques provide a dual datapath implementation for incoming/outgoing packets in order to improve routing/forwarding functionality with enhanced packet processing. Via the dual datapath implementation, packets of a same flow may be diverted away from a kernel datapath (e.g., having a custom kernel program and/or an operating system networking stack) and to the user datapath (e.g., having a custom user application) for packet processing (e.g., routing/forwarding decisions) while packets of a different flow are either handled by the custom networking stack or are consumed internally. In some examples and after a number of packets of the same flow, subsequent packets of the same flow may have a next destination programmed into the kernel space (e.g., in a memory area for the network interface driver).

FIG. 1 is a block diagram illustrating an example network 8 having a data center 10 in which examples of the techniques described herein may be implemented. In general, data center 10 provides an operating environment for applications and services for customers 11 coupled to the data center by service provider network 7. Data center 10 may, for example, host infrastructure equipment, such as networking and storage systems, redundant power supplies, and environmental controls. Service provider network 7 may be coupled to one or more networks administered by other providers and may thus form part of a large-scale public network infrastructure, e.g., the Internet.

In some examples, data center 10 may represent one of many geographically distributed network data centers. As illustrated in the example of FIG. 1, data center 10 may be a facility that provides network services for customers 11. Customers 11 may be collective entities such as enterprises and governments or individuals. For example, a network data center may host web services for several enterprises and end users. Other exemplary services may include data storage, virtual private networks, traffic engineering, file service, data mining, scientific- or super-computing, and so on. In some embodiments, data center 10 may be individual network servers, network peers, or otherwise.

In this example, data center 10 includes a set of storage systems and application servers 12A-12X (herein, "servers 12") interconnected via high-speed switch fabric 14 provided by one or more tiers of physical network switches and routers. Switch fabric 14 is provided by a set of interconnected top-of-rack (TOR) switches 16A-16BN (collectively, "TOR switches 16") coupled to a distribution layer of chassis switches 18A-18M (collectively, "chassis switches 18"). Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In this example, TOR switches 16 and chassis switches 18 provide servers 12 with redundant (multi-homed) connectivity to IP fabric 20 and service provider network 7 via subnets 17.1-17.N (collectively "subnets 17"). Chassis switches 18 aggregate traffic flows and provides high-speed connectivity between TOR switches 16. TOR switches 16 may be network devices that provide layer two (e.g., MAC) and/or layer 3 (e.g., IP) routing and/or switching functionality. TOR switches 16 and chassis switches 18 may each include one or more processors and a memory, and that are capable of executing one or more software processes. Chassis switches 18 are coupled to IP fabric 20, which performs layer 3 routing to route network traffic between data center 10 and customers 11 by service provider network 7.

Virtual network controller 22 ("VNC") provides a logically and in some cases physically centralized controller (in software) for facilitating operation of one or more virtual networks within data center 10 in accordance with one or more embodiments of this disclosure. In some examples, virtual network controller 22 is a software component that emulates/virtualizes a hardware component (e.g., a circuit board or chipset) known as a network controller (e.g., a network interface card (NIC)), which is installed on a computing device to communicate with a physical network. In general, the (physical) network controller provides functionality to other computing devices, such as support for I/O interrupt, direct memory access (DMA) interfaces, data transmission, network traffic engineering and partitioning. In some examples, virtual network controller 22 may operate in response to configuration input received from network administrator 24.

NIC is both a physical layer and a data link layer device, i.e. it provides the necessary hardware circuitry so that the physical layer processes and some data link layer processes can run on it. A virtual NIC that is bridged to a physical NIC is a true Ethernet bridge in the strictest sense. Its packets are sent on the wire with its own unique MAC address. The physical NIC driver runs the bridged physical NIC in promiscuous mode so that replies to that MAC address are picked up. The virtual NIC appears on the local Ethernet segment indistinguishably from any real machine. As a result, a virtual machine with a bridged virtual NIC can fully participate in accessing and providing network services. In general, virtual network controller 22 may instruct servers 12 and any physical or virtual network devices of network 7 to perform various operations, such as forwarding traffic through the overlay networks; re-routing traffic in the virtual networks due to network events; replicating traffic for multicasting, networking services including security, Network Address Translation (NAT), mirroring, and load balancing; providing multi-tenant services to support multiple virtual networks; monitoring and logging traffic characteristics within the virtual networks; and other operations.

In one example approach, virtual network controller 22 is a logically centralized but physically distributed software defined network ("SDN) controller. Physically distributed means that the virtual network controller 22 may include multiple types of nodes, each of which may have multiple instances for high availability (HA) and horizontal scaling. In one such example approach, the virtual network controller 22 includes three types of nodes: configuration nodes, control nodes and analytics nodes. These node instances may be implemented in physical servers 12 or on virtual machines. In one such example approach, configuration nodes in virtual network controller 22 configure the control nodes via a technology data model stored on Interface for Metadata Access Points (IF-MAP) server 26.

Typically, the traffic between any two network devices, such as between network devices within IP fabric 20 (not shown), different servers 12, or customers 11 and servers 12, for example, can traverse the physical network using many different paths. For example, there may be several different paths of equal cost between two network devices. In some cases, packets belonging to network traffic from one network device to the other may be distributed among the various possible paths using a routing strategy called multi-path routing at each network switch node. For example, the Internet Engineering Task Force (IETF) RFC 2992, "Analysis of an Equal-Cost Multi-Path Algorithm," describes a routing technique for routing packets along multiple paths of equal cost. The techniques of RFC 2992 analyze one particular multipath routing strategy involving the assignment of flows to bins by hashing packet header fields that sends all packets from a particular network flow over a single deterministic path.

For example, a "flow" can be defined by the five values used in a header of a packet, or "five-tuple," i.e., the protocol, Source IP address, Destination IP address, Source port and Destination port that are used to route packets through the physical network. For example, the protocol specifies the communications protocol, such as TCP or UDP, and Source port and Destination port refer to source and destination ports of the connection. A set of one or more packet data units (PDUs) that match a particular flow entry represent a flow. Flows may be broadly classified using any parameter of a PDU, such as source and destination data link (e.g., MAC) and network (e.g., IP) addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port.

In accordance with various aspects of the techniques described in this disclosure, one or more of servers 12 may include network device 30 that executes multiple routing instances for corresponding physical networks and/or virtual networks within data center 10. Network device 30, representing any one or more of the network device examples described herein, may be implemented, in software, as a logical device (e.g., a virtual router or switch) or, in hardware, as an electrical device (e.g., a physical router or switch). To achieve high sustained throughput and/or low latency in network 7, network device 30 of any server 12 implements a software program for executing routing instances corresponding to incoming/outgoing packets and configures that software program (e.g., a control program) to operate in user space (e.g., to run as a user space application).

In one example implementation, network device 30 is configured to run a control program in user space for packet processing and designate that control program as part of a datapath for incoming packets. This user datapath may be in addition to or instead of a datapath in kernel space. An operating system, a primary control program, may provide a computing environment in kernel space on which another program (e.g., another control program) initiates a kernel datapath for incoming packets. The kernel datapath may include software code forming a pipeline in which a software stack implements one or more networking layers and one or more layers in the stack are applied to the incoming packets. Network drivers following the (e.g., single) kernel datapath (e.g., according to a software stack representation) refrain from executing any code not found in that software stack. Network devices having the above network driver may invoke functionality in user space, for instance, to return, in a message to the above network driver, information indicating a destination along with a copy of any packet data received from the network driver. Copies of the packet data are transmitted to memory areas in the user space and then, returned to a position along the kernel datapath (e.g., a same memory area in the kernel space), hence, resulting in little or no progress made along the kernel data path.

For a number of reasons, the network driver may filter certain packets from kernel space into user space. In traditional network devices implementing a single kernel data path, prior to path determination, a different network driver may enqueue in kernel space (e.g., memory) incoming packets received via an ingress network interface, causing non-trivial delays in packet processing (e.g., packet transmission). In effect, such enqueuing substantially halts the kernel datapath until at least one routing/forwarding decision is programmed into the kernel space (e.g., memory). Aggregating an additional latency to the above latencies, some example implementations of the kernel datapath utilize user space resources but enforce a single datapath for all incoming packets, for example, by retaining those packets in the kernel space without diverting any to the user space and/or by copying one or more packets back and forth between the kernel space and the user space.

Network device 30 implements a full datapath in user space, as described herein for some examples, by configuring a filter in kernel space to deviate the incoming packets into the user datapath where a user control program performs packet processing operations (e.g., for path determination). Generally, a filter may be configured on an operating system hook point at which a sub-system (e.g., a container/virtual machine) runs an environment for executing the filter to handle operations of the user control program. When the incoming packets reach the hook point, the network driver executes the filter from kernel space memory with rights granted for accessing at least one memory area programmed by software code executed in user space and in turn, the sub-system loads the filter to handle communications from the user control program. The user control program may instruct, via the filter, the sub-system to generate an interface (e.g., a socket interface such as an AF_XDP socket) between at least one user space memory area and memory areas in the kernel space. This interface may be known as an ingress socket interface.

To complete an embodiment of the user datapath in the dual datapath implementation described herein, the user control program invokes functionality (e.g., of the XDP sub-system) to generate a second interface (e.g., a socket interface such as an AF_XDP socket) between the at least one memory area (e.g., shared memory) and memory areas in the kernel space (e.g., network driver code point for an egress network interface). The second interface may be known as an egress socket interface.

Another embodiment of the network driver may constitute as at least part of the kernel datapath and, via hooks (e.g., pre-routing hook point), may call a custom kernel program configured to initiate the user datapath by placing an incoming packet onto shared memory and then, generating a memory map of the shared memory. The memory map is configured to direct the user datapath to specific memory locations within the packet.

The software stack, herein referred to as a networking stack, may include software programs for a number of communication protocols where each software program is configured to process a packet in accordance with a corresponding networking layer. The network driver may invoke programming for a next networking layer in the stack, progressing the packet through the kernel datapath (e.g., until transmission to a next device or consumption by a local application). A networking layer may be programmed in memory as part of the kernel datapath for the packet. At least one program (operating as a layer 2 or layer 3/4 protocol) may resolve routing and/or forwarding decisions. As described herein, the kernel space is restricted to kernel-approved programs and while the kernel datapath may invoke some user space functionality (e.g., a network service), a considerable amount of time is needed, for example, to copy packets back and forth. Ultimately, packet transmission is performed by the kernel datapath, which submits outbound packets for egress via a second network interface.

The user datapath may be another internal datapath that the network driver has programmed in memory as path or pipeline for incoming packets. Similar to the kernel datapath, the user datapath may include code points that are stored in the memory for user space; these memory locations are accessible to the network driver in kernel space. The user datapath may be a single datapath in the network device for example, as a replacement for the kernel datapath. In other examples, the user datapath may be alternative to the kernel datapath.

To form a (e.g., pipeline) representation of the user datapath, the network driver may organize software programs comprising this datapath into a structure (e.g., a software stack). The network driver may store the representation in user space memory and execute code for that structure for one or more incoming packets in network devices having a single user datapath. For a dual datapath implementation, a kernel program (e.g., an eBPF XDP program) may be configured to divert incoming packet(s) from the kernel datapath and onto the user datapath. The network driver may bind XDP to a hooked code point such that in response to a packet traversing the hooked code point, the network driver loads the eBPF XDP program into kernel space memory and then, binds the eBPF XDP program to the ingress network interface. Hence, the eBPF XDP program may be bound to a virtual network interface or a physical network interface.

Because eBPF XDP program resides in kernel space, socket interfaces may be an optional feature (e.g., an add-on). Some examples of the dual datapath implementation do not rely on AF_XDP sockets for communications between the kernel space and the user space. Memory areas that exist in the kernel space may store a copy of a packet and the kernel program may have that copy transferred to user space, for example, by having those memory areas shared with the with the user space. This may be accomplished by way of memory mapping where the network driver (or another operating system component) is to map a kernel address space to a user address space. This eliminates the overhead of copying user space information into the kernel space and vice versa. The network driver may configure a user space network interface instead of a socket interface. The network driver may create virtual memory areas with virtual addresses and physical addresses. Processing circuitry (e.g., a CPU) may access (from kernel space) virtual addresses that are translated by a memory management unit into physical addresses with the help of page tables. Hence, memory areas comprising packet data are mapped in multiples of a page size.

In other examples, there may be a copy in the kernel where the packet gets made into the memory and then, shared with the user space via an ingress socket interface. By memory mapping that copy, mapping information is generated to direct the user datapath to appropriate memory locations within that packet. The user datapath proceed to parse the packet and execute various programs to perform various packet processing operations as described herein. The kernel program may operate as an interface (e.g., an Application Programming Interface (API)) for the user datapath to invoke kernel space functionality. Because the memory being mapped has an address space in kernel space, the user datapath may invoke helper functions in the kernel space. The user datapath uses the egress socket interface for packet transmission to the next destination.

Although the above description relates to network device 30 performing packet processing operations for both non-tunneled and tunneled packets for ingress to server 12A, FIG. 1 illustrate networking infrastructure for overlay networks and network device 30 may configure the control program to process (specifically) tunneled packets in the user space of server 12A as follows in the present disclosure.

Packets received by the network device of server 12A, for instance, from the underlying physical network fabric may include an outer header to allow the physical network fabric to tunnel the payload or "inner packet" to a physical network address for a network interface of server 12A that executes the network device. The outer header may include not only the physical network address of the network interface of the server but also a virtual network identifier such as a VxLAN tag or Multiprotocol Label Switching (MPLS) label that identifies one of the virtual networks as well as the corresponding routing instance executed by the network device. An inner packet includes an inner header having a destination network address that conform to the virtual network addressing space for the virtual network identified by the virtual network identifier. In the example approach of FIG. 1, a network device 30 on server 12A communicates via a tunnel 15 to a network device 30 on server 12X, as will be discussed in more detail below.

In some example approaches, network device 30 directs, to the user control program operating in user space, one or more tunneled packets received from the underlying physical network fabric prior to delivery to the appropriate routing instance for the packets. In some examples, the network device 30 diverts a first packet of each (new) flow to a user datapath where the user control program schedules generation of a (new) flow context and its programming into the kernel space. In other examples, the network device 30 diverts one or more packets of a same flow to the user datapath for packet processing according to matching criteria that includes the virtual network identifier of the outer header as well as one or more fields of the inner header. That is, network device 30 executing on one of servers 12 may receive inbound tunnel packets of a packet flow from switches 16 and, prior to forwarding the tunnel packets to a locally executing virtual machine, a remotely executing virtual machine, and/or a device in a different network, process the tunnel packets in user space instead of in kernel space.

In some example implementations, the network devices 30 executing on servers 12 may steer received inbound tunnel packets among multiple processor cores to facilitate packet processing load balancing among the cores when processing the packets for routing to one or more virtual and/or physical machines.

In other example implementations, the network devices 30 executing on servers 12 may proactively add, by the network device, flow table entries to identify reverse flows of flows processed by a routing instance of the network device.

It should be noted that network devices practicing the techniques described herein may include a user datapath implemented in software and/or hardware. The user datapath, as either a software-based implementation or a hardware-based implementation, represents a complete datapath for packet reception and packet transmission. The techniques disclosed in the above description for FIG. 1 related to network device 30 executing on servers 12 and having a software-based user datapath for performing packet processing operations for ingress data and handling transmission of egress data to the next destination.

The present disclosure also describes examples of the hardware-based implementation of a user datapath for performing packet processing operations for ingress data and handling transmission of egress data to the next destination. Similar to network device 30, the network device having the hardware-based implementation may be part of a network system involving a plurality of networks. As one example, a network device may include a hardware unit for the storing and/or executing the user datapath, for instance, for forwarding packet(s) of the ingress data as outgoing packet(s) of the egress data. A user module of the user datapath may be referred to as a packet processor. The hardware unit may include a first network interface card (NIC) configured for packet reception and a second network interface card (NIC) configured for packet transmission where each network interface card is communicatively coupled to respective network devices. At least one packet processor may be operably coupled to a memory, executable from the memory by processing circuitry, and configured to run in the user space. An internal datapath comprising logic to run in the kernel space for transferring incoming packets from the first network interface card to the at least one packet processor. The internal datapath further comprising logic to run in the user space for transferring outgoing packets from the at least one packet processor to the second network interface card. As described herein, the at least one packet processor may be part of a user datapath for determining a next destination for the incoming packets and then, modifying the incoming packets to generate the outgoing packets. At least a portion of the internal datapath may be stored in the memory and is executable by processing circuitry.

Figure 2:
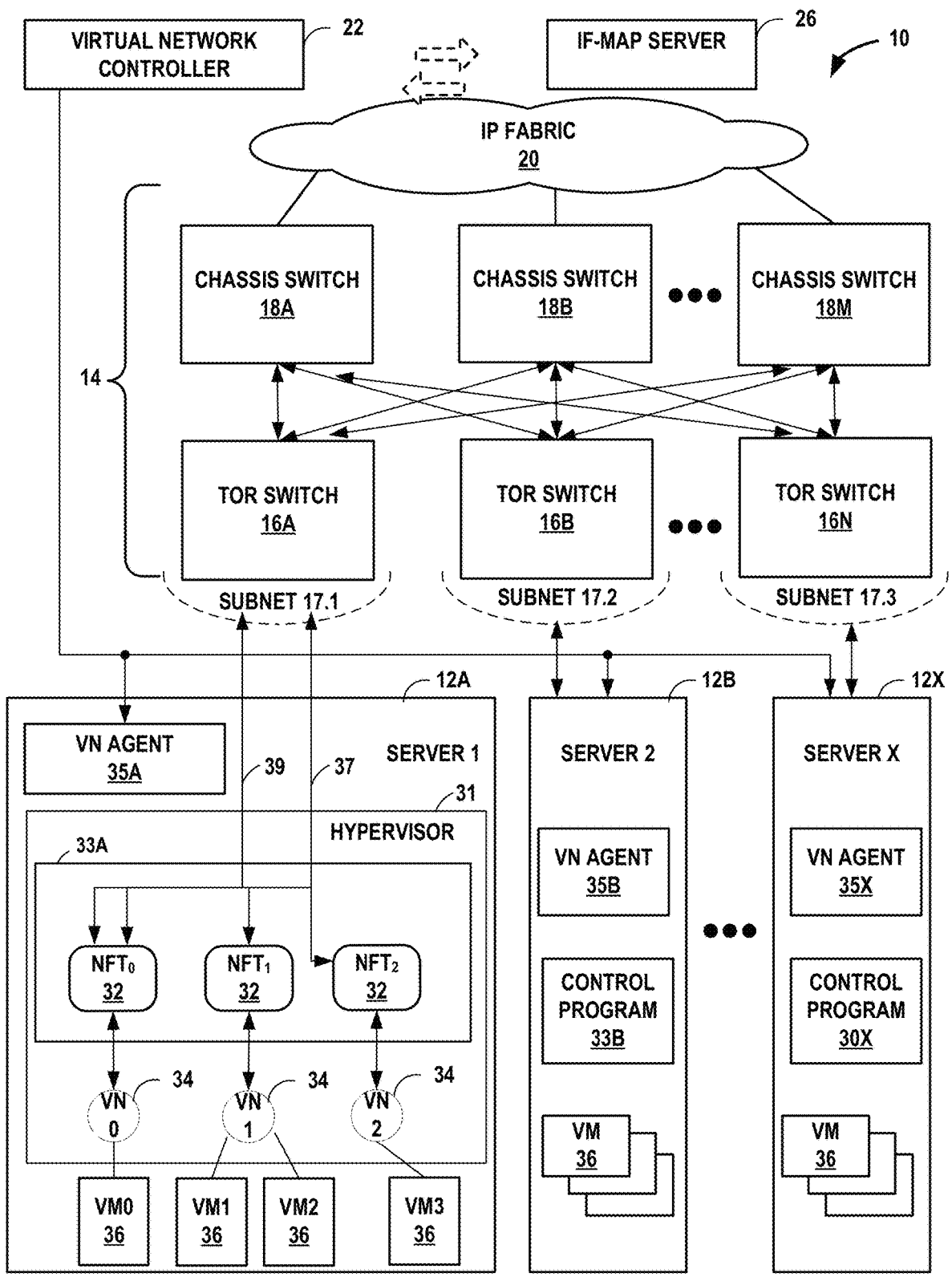
FIG. 2 is a block diagram illustrating an example implementation of the data center of FIG. 1 in further detail.

FIG. 2 is a block diagram illustrating an example implementation of data center 10 of FIG. 1 in further detail. In the example of FIG. 2, data center 10 includes an overlay network that extends switch fabric 14 from physical switches 16, 18 to software or "virtual" switches 30A-30X (collectively, "network devices 30"). Network devices 30 dynamically create and manage one or more virtual networks 34 usable for communication between application instances. In one example, network devices 30 execute the virtual network as an overlay network, which provides the capability to decouple an application's virtual address from a physical address (e.g., IP address) of the one of servers 12A-12X ("servers 12") on which the application is executing. Each virtual network may use its own addressing and security scheme and may be viewed as orthogonal from the physical network and its addressing scheme. Various techniques may be used to transport packets within and across virtual networks 34 over the physical network. In some examples, the techniques described in this disclosure enable enhanced packet processing functionality in network devices, for example, by off-loading certain operations onto user space.

Each network device (e.g., network device 30 of FIG. 1) may execute one or both datapaths of the dual datapath implementation within a hypervisor 31, a host operating system or other component of each of servers 12. Each of servers 12 may represent an x86 or other general-purpose or special-purpose device (e.g., server or router/switch) capable of executing virtual machines 36. In the example of FIG. 2, control program 33 executes within hypervisor 31, also often referred to as a virtual machine manager (VMM), which provides a virtualization platform that allows multiple operating systems to run concurrently on one of servers 12.

As described herein for network device 30 of FIG. 1, the host operating system may program a kernel datapath and a user datapath into hypervisor 31 and/or one or more host operating system components. In the example of FIG. 2, hypervisor 31 executes control program 33, a user module, in user space when prompted by ingress data from a kernel program running in kernel space. Control program 33 and the kernel program represent (at least a part of) the user datapath and the kernel datapath, respectively, as described herein. The kernel program, in combination with one or more other software components running in the kernel space, may form an entirety of the kernel datapath described herein. Suitable examples of the above kernel program include packet filtering modules, such as an extended Berkeley Packet Filter (eBPF) program running an eXpress Data Path (XDP) subsystem. A operating system (e.g., host or guest/virtual operating system) component may support the kernel program, such as a custom kernel program or a networking stack; one example component may be a network interface driver and there are a number of examples of the kernel program that the driver may employ. As an option, multiple software programs may combine to form the kernel program.

Control program 33 and one or more hardware/software components cooperate on packet processing operations by following the user datapath until packet transmission via egress network interface. For example, control program 33A and VN agent 35A may be configured to exchange data (e.g., packet header data, packet payload data, inter-process message data, process data, and/or the like) to perform certain routing/forwarding operations. The kernel datapath described herein (e.g. the kernel program) and control program 33 of the user datapath (e.g., the user module) may form an example embodiment of network device 30 of FIG. 1.

An alternative hardware architecture of network device 30 of FIG. 1 may include a number of hardware components, such as a (hardware) forwarding unit configured with logic for forwarding plane functionality, a (hardware) control unit configured with logic for control plane functionality, and/or the like. When implemented in some examples of the alternative hardware architecture, control program 33A may be programmed into the forwarding unit to implement the forwarding plane functionality and VN agent 35A may be programmed into the control unit to implement the control plane functionality.

In the example of FIG. 2, network device 30A (not shown) manages virtual networks 34, each of which provides a network environment for use by the one or more virtual machines (VMs) 36 executing on top of the virtualization platform provided by hypervisor 31. Each VM 36 is associated with one of the virtual networks VN0-VN1 and may represent tenant VMs running customer applications such as Web servers, database servers, enterprise applications, or hosting virtualized services used to create service chains. In some cases, any one or more of servers 12 or another computing device may host customer applications directly, i.e., not as virtual machines. Virtual machines as referenced herein, e.g., VMs 36, 110, and servers 12 or a separate computing device that hosts a customer application may alternatively referred to as "hosts."

In general, each VM 36 may be any type of software application and may be assigned a virtual address for use within a corresponding virtual network 34, where each of the virtual networks may be a different virtual subnet provided by control program 33A. A VM 36 may be assigned its own virtual layer three (L3) IP address, for example, for sending and receiving communications but may be unaware of an IP address of the physical server 12A on which the virtual machine is executing. In this way, a "virtual address" is an address for an application that differs from the logical address for the underlying, physical computer system, e.g., server 12A in the example of FIG. 2.

In one implementation, each of servers 12 includes a corresponding one of virtual network (VN) agents 35A-35X (collectively, "VN agents 35") that controls the overlay of virtual networks 34 and that coordinates the routing of data packets within server 12. In general, each VN agent 35 communicates with virtual network controller 22, which generates commands to control routing of packets through data center 10. VN agents 35 may operate as a proxy for control plane messages between virtual machines 36 and virtual network controller 22. For example, a VM 36 may request to send a message using its virtual address via the VN agent 35A, and VN agent 35A may in turn send the message and request that a response to the message be received for the virtual address of the VM 36 that originated the first message. In some cases, a VM 36 may invoke a procedure or function call presented by an application programming interface of VN agent 35A, and the VN agent 35A may handle encapsulation of the message as well, including addressing.

In one example, network packets, e.g., layer three (L3) IP packets or layer two (L2) Ethernet packets generated or consumed by the instances of applications executed by virtual machines 36 within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed within network device 30 of FIG. 1 or control program 33, e.g., within the hypervisor 31 or the host operating system running on each of servers 12. As another example, encapsulation and de-capsulation functions may be performed at the edge of switch fabric 14 at a first-hop TOR switch 16 that is one hop removed from the application instance that originated the packet. As noted above, this functionality is referred to herein as tunneling and may be used within data center 10 to create one or more overlay networks. Besides IPinIP, other example tunneling protocols that may be used include IP over GRE, VxLAN, MPLS over GRE, MPLS over UDP, etc.

As noted above, virtual network controller 22 provides a logically centralized controller for facilitating operation of one or more virtual networks within data center 10. Virtual network controller 22 may, for example, maintain a routing information base, e.g., one or more routing tables that store routing information for the physical network as well as one or more overlay networks of data center 10. Similarly, switches 16, 18 and network devices 30 maintain routing information, such as one or more routing and/or forwarding tables. In one example implementation, control program 33A of hypervisor 31 implements a network forwarding table (NFT) 32 for each virtual network 34. In general, each NFT 32 stores forwarding information for the corresponding virtual network 34 and identifies where data packets are to be forwarded and whether the packets are to be encapsulated in a tunneling protocol, such as with a tunnel header that may include one or more headers for different layers of the virtual network protocol stack.

In one such example approach, virtual machine VM1 sends an "inner packet" to control program 33A by an internal link. Control program 33A uses $NFT_1$ to look up a virtual network destination network address for the inner packet. In one such example approach, $NFT_1$ specifies an outbound interface for control program 33A and encapsulation for the inner packet. Control program 33A applies the encapsulation to add a tunnel header to generate an outer packet and outputs the outer packet on the outbound interface or, in this case, toward TOR switch 16A.

The routing information may, for example, map packet key information (e.g., destination IP information and other select information from packet headers) to one or more specific next hops within the networks provided by control programs 33 and switch fabric 14. In some case, the next hops may be chained next hops that specify a set of operations to be performed on each packet when forwarding the packet, such as may be used for flooding next hops and multicast replication. In some cases, virtual network controller 22 maintains the routing information in the form of a radix tree having leaf nodes that represent destinations within the network.

As shown in FIG. 2, each virtual network 34 provides an encapsulated packet communications framework 37 for the overlay network established through switch fabric 14. In this way, network packets associated with any of virtual machines 36 may be transported using encapsulated packet communications framework 37 via the overlay network. In addition, in the example of FIG. 2, each control program 33 includes a default network forwarding table $NFT_0$ and provides a default route that allows a packet to be forwarded to virtual subnet VN0 without encapsulation, i.e., non-encapsulated packet communications framework 39 per the routing rules of the physical network of data center 10. In this way, subnet VN0 and virtual default network forwarding table $NFT_0$ provide a mechanism for bypassing the overlay network and sending non-encapsulated packet communications via non-encapsulated communications framework 39 to switch fabric 14.

Moreover, virtual network controller 22 and control program 33 (or network devices 30 of FIG. 1) may communicate using virtual subnet VN0 in accordance with default network forwarding table $NFT_0$ 32 during discovery and initialization of the overlay network, and during conditions where a failed link has temporarily halted communication via the overlay network. Once connectivity with the virtual network controller 22 is established, the virtual network controller 22 updates its local routing table to take into account new information about any failed links and directs control programs 33 to update their local network forwarding tables 32. For example, virtual network controller 22 may output commands to virtual network agents 35 to update one or more NFTs 32 to direct control programs 33 to change the tunneling encapsulation so as to re-route communications within the overlay network such as, for example, to avoid a failed link.

When a link failure is detected, a virtual network agent 35 local to the failed link (e.g., VN Agent 35A) may immediately change the encapsulation of network packets to redirect traffic within the overlay network and may notify virtual network controller 22 of the routing change. In turn, virtual network controller 22 may update its routing information and may issue messages to other virtual network agents 35 to update local routing information stored by the virtual network agents within network forwarding tables 32.

Figure 3:
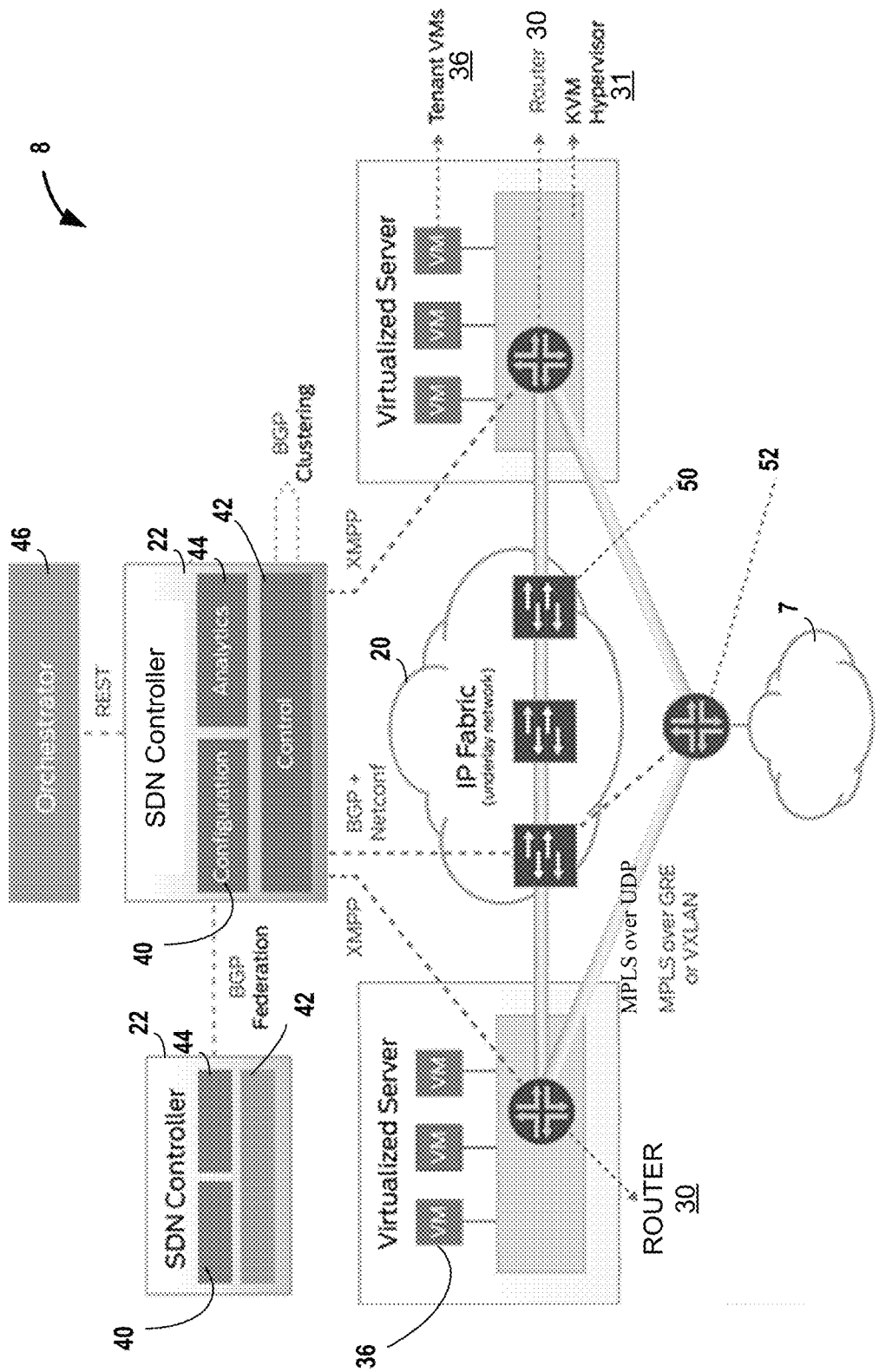
FIG. 3 is a block diagram illustrating a software defined network as an embodiment of the example network of FIG. 1 according to techniques described herein.

FIG. 3 is a block diagram illustrating an example software defined network implementation of network 8 (FIGS. 1-2) according to techniques described herein. In one example approach, each network device 30 forwards packets from one virtual machine 36 to other virtual machines via a set of server-to-server tunnels. The tunnels form an overlay network sitting on top of the physical network (such as, for example, a physical IP-over-Ethernet network). In the example shown in FIG. 3, virtual machines 36 on one network device 30 communicate with virtual machines 36 on other network devices 30 via MPLS over GRE, MPLS over UDP or VXLAN.

In the example approach of FIG. 3, virtual network controller 22 is a software defined network (SDN) controller. As noted above in the discussion of FIG. 1, in one example approach, virtual network controller 22 is logically centralized but may be physically distributed across many devices. In one example approach, controller 22 includes multiple types of nodes, each of which may have multiple instances for high availability (HA) and horizontal scaling. In one such example approach, the virtual network controller 22 includes three types of nodes: configuration nodes 40, control nodes 42 and analytics nodes 44. These node instances may be implemented in physical servers 12 or on virtual machines. In one such example approach, configuration nodes 40 in virtual network controller 22 configure the control nodes via a technology data model stored on Interface for Metadata Access Points (IF-MAP) server 26.

In one example approach, configuration nodes 40 provide a management layer used to configure control node 42. In the example shown in FIG. 3, configuration nodes 40 provide a northbound Representational State Transfer (REST) application programming interface (API) that may be used by an orchestrator 46 to configure network 8 or to extract operational status of network 8. In one example approach, instantiated services are represented by objects in a horizontally scalable database that is described by a formal service data model. The configuration nodes also contain a transformation engine (sometimes referred to as a compiler) that transforms the objects in the high-level service data model into corresponding lower-level objects in the technology data model. The high-level service data model describes what services need to be implemented while the low-level technology data model describes how those services need to be implemented. In one example approach, objects describing instantiated services are defined via a formal service data model. That formal service data model may be converted into a low-level technology data model describing how the services are to be implemented. In one such example approach, configuration nodes 40 in virtual network controller 22 publish the contents of the low-level technology data model stored on Interface for Metadata Access Points (IF-MAP) server 26 to the control nodes using the IF-MAP protocol.

In one example approach, control nodes 42 implement the logically centralized portion of the control plane. Not all control plane functions are logically centralized—some control plane functions are still implemented in a distributed fashion on the physical and virtual network devices 30 (e.g., routers and switches) in the network 8. The control nodes 42 may use the IF-MAP protocol to monitor the contents of the low-level technology data model as computed by the configuration nodes 40 that describe the desired state of the network. The control nodes 42 may use a combination of southbound protocols (such as Extensible Messaging and Presence Protocol (XMPP)) to configure network devices 30 and Border Gateway Protocol (BGP) and Network Configuration (NETCONF) protocols to control physical routers (such as underlay switches 50 in IP fabric 20). In some such example approaches the BGP and NETCONF protocols may also be used to control gateways 52. In one example approach, control nodes 42 also use BGP for state synchronization among each other when there are multiple instances of control node 42 for scale-out and HA reasons.

In one example approach, analytics nodes 44 are used to collect, collate, and present analytics information for troubleshooting problems and for determining network usage. In one such example approach, each component of network 8 generates detailed event records for significant events in the system. These event records may be sent to one of multiple instances (for scale-out) of the analytics node 44 that collate and store the information in a horizontally scalable database using a format that is optimized for time-series analysis and queries. The analytics nodes 44 may also include mechanisms to automatically trigger the collection of more detailed records when certain events occur, allowing network control 22 to get to the root cause of any issue without having to reproduce it. In one example approach, analytics nodes 44 also provide a northbound analytics query REST API to orchestrator 46.

In one example approach, virtual network controller 22 implements three basic building blocks: multi-tenancy, gateway functions and service chaining. Multi-tenancy, also known as network virtualization or network slicing, is the ability to create virtual networks that provide closed user groups to sets of VMs 36. Gateway functions refer to the ability to connect virtual networks to physical networks via a gateway router (for example, the Internet) and the ability to attach a non-virtualized server or networking service to a virtual network via a gateway. Service chaining, also known as NFV, is the ability to steer flows of traffic through a sequence of physical or virtual network services such as firewalls, DPI, or load balancers.

The present disclosure describes a number of examples in which implementing dual datapaths improve upon the performance of network device 30 when compared to a single datapath implementation and/or service changing of any number of network functions. Having a datapath in kernel space restricts network device 30 to a limited set of packet processing operations. In contrast, having a datapath in user space for routing/forwarding packets enables additional functionality for network device 30. This may be because there are a variety of additional applications configured for enhanced packet processing and available for inclusion in the user datapath. When incoming packets arrive at a network interface card, network device 30 may execute applications along the user datapath, for example, to determine of a next destination for those packets. In addition to the above determination of the next destination, at least one additional application may be executed for the user datapath to enhance its packet processing operations.

One example application configured for enhanced packet processing may be configured with software code to implement online Deep Packet Inspection (DPI)-related functionality. Online DPI may be beneficial when employed in an application that provides L7 firewall (IDS/IPS) support. Another example application for enhanced packet processing may be a security application configured to perform signature and protocol anomaly checks on one or more packets of a same flow. A third example application may be configured to handle application-level gateway support, such as for FTP or SIP; other protocols may benefit, for example, when more complex checks are needed. Offloading the packet processing operations to the user space provides additional benefits and advantages, for example, by significantly reducing the risk to kernel health and avoiding significant costs in resources and time due to moving into a code base within the kernel space, user application software code for enhanced packing processing. This approach also avoids degradation of the kernel forwarding performance, for the most common forwarding cases.

Figure 4A:
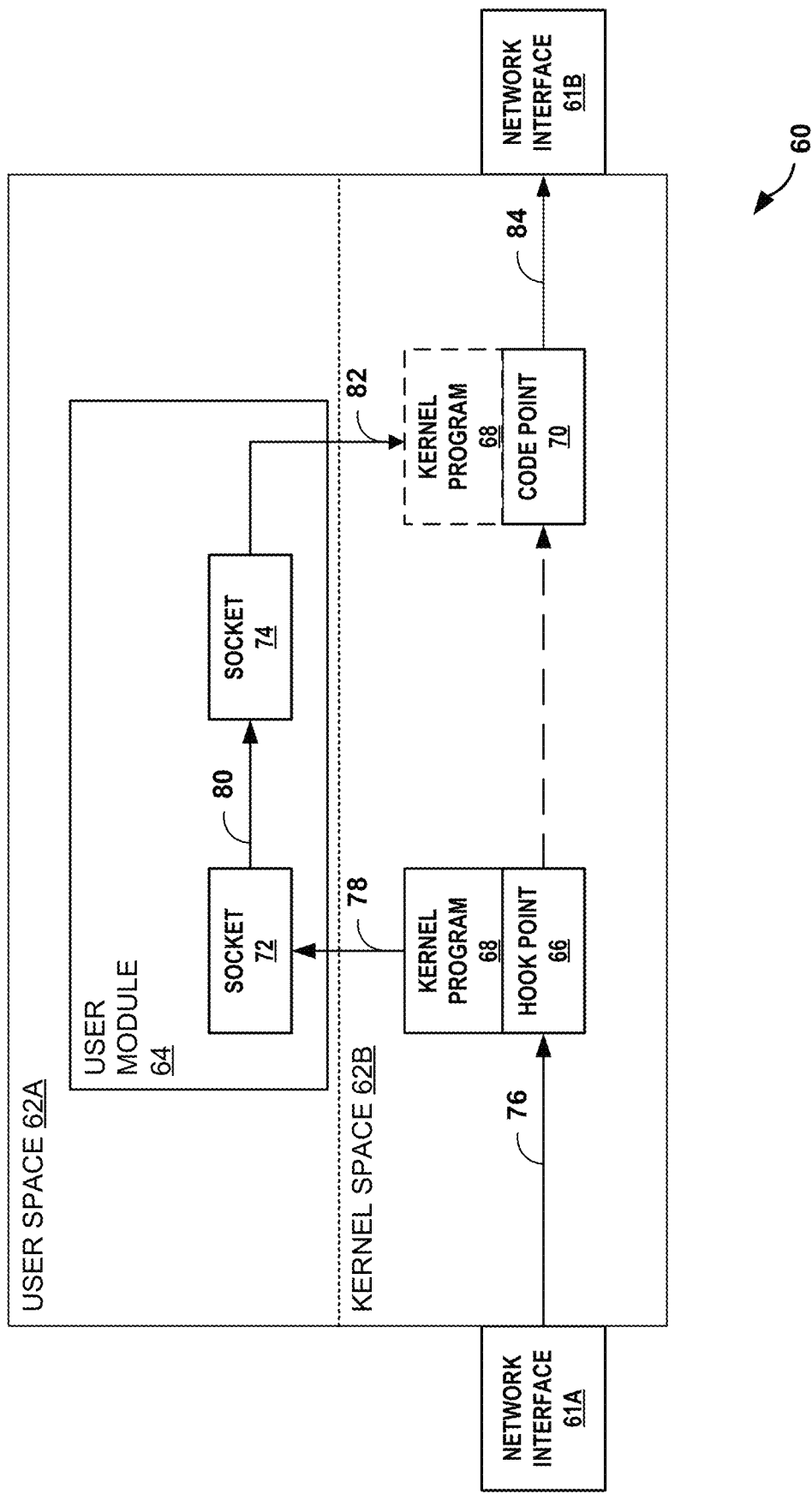
FIG. 4A is a flow diagram illustrating an example dual datapath implementation for an example network device of the example network of FIG. 1 according to techniques described herein.

FIG. 4A is a flow diagram illustrating an example dual datapath implementation for computing device 60 of the example network of FIG. 1 according to techniques described herein. Computing device 60 as described herein may be a type of network device (e.g., a physical router or switch), or a physical computer/virtual machine representing a type of network device (e., virtual router/switch). Regardless of which embodiment has been implemented, computing device 60 is configured with appropriate functionality for packet processing (e.g., routing/forwarding decisions).

As depicted in FIG. 4A, computing device 60 (or, simply, device 60) includes various hardware/software components for the example dual datapath implementation. These hardware/software components include a variety of physical components based in hardware and/or virtual components based in software. Network interface 61A, network interface 61B, and possibly more network interfaces are examples of the hardware/software components that computing device 60 supports. Network interface 61A may represent forwarding hardware (e.g., in ASICs) such as a forwarding unit of a physical network interface card (NIC) in a physical computer or in a type of network device (e.g., a router or switch). Network interface 61A may also represent a virtual NIC.

In general, the dual datapath implementation refers to device 60 having a packet processing path in user space 62A and a separate packet processing path in kernel space 62B. Ingress data comprising one or more incoming packets proceeds through one of these processing paths and is either consumed by an application in user space 62A or forwarded to a next destination (i.e., a next hop) of a route. When forwarded to the next destination by either user module 64 in user space 62A or a networking stack in kernel space 62B, the incoming packets are modified to include information identifying the next destination (e.g., in a modified packet header). The modified packets become outgoing packets of egress data for packet transmission. In the processing path in user space 62A, user module 64 determines the next destination and then, feeds the outgoing packets directly to an appropriate egress network interface (e.g., network interface 61B). In another processing path, the networking stack in kernel space 62B determines the next destination and then, feeds the incoming packets directly to the appropriate network interface.

Network interfaces 61 includes hardware/software components for handling the ingress data and the egress data. Each network interface 61 within computing device 60 is registered with data structures and other components within kernel space 62B. For this reason, when packets are exchanged with a network of other devices, network interfaces 61 receive incoming packets from a network device and transmit outgoing packets to the same network device or a different network device. In each case, a network driver (e.g., also known as a network device driver) in kernel space 62B processes the incoming packets after reception by network interface 61A and, in some examples, the outgoing packets prior to transmission by network interface 61B. In other examples, user module 64 is configured with an interface, socket 74, to directly insert the outgoing packets of the egress data into packet buffers in memory areas of network interfaces 61. The network driver, on behalf of kernel program 68, stores the outgoing packets of the egress data in shared memory areas between user space 62A and kernel space 62B. The network driver in kernel space 62B includes a number of hook points to redirect the incoming packets to user module 64 or another application in user space 62A.

Hook point 66 refers to hooked software code in the above network driver. In general, hook point 66 directs a flow of ingress data to user space 62A along a user datapath or to kernel space 62B along a kernel datapath. When the packet first arrives at network interface 61A, the network driver accesses the packet and beings processing the packet along kernel datapath until the hook point is reached. The packet passes through eXpress Data Path (XDP), which is an example embodiment of hook point 66 and part of a subsystem in a Linux Operating System (OS). Reaching hook point 66 in the network device driver causes execution of kernel program 68 (e.g., an extended Berkeley Packet Filter (eBPF) program) in kernel space 62B (e.g., inside memory areas of the network driver) and then, prompts user module 64 to load execute kernel program 68 into memory areas in kernel space 62B.

Kernel program 68 may be referred to as an eBPF XDP module running in a virtual machine/virtual container configured to generate an operating environment to run eBPF programs. In some examples, kernel program 68 enables interfaces between user module 64 and memory areas in kernel space 62B, such as the memory areas of the networking stack and the network interfaces 61. In one example, kernel program 68 is configured to couple socket 72 to memory areas in kernel space 62B including network interface 61A. In this manner, subsequent packets of the same flow arriving at network interface 61A are redirected into user space 62A by kernel program 68; however, in some alternatives, kernel program 68 or another kernel space 62B component (e.g., the network device driver) may include programming for a next destination of the flow (e.g., a flow context) and redirect the subsequent packets of the same flow to network interface 61B for transmission to the next destination. In one example, kernel program 68 is configured to generate and then, couple socket 74 to network interface 61B.

In general, user module 64 is an application (e.g., control program) configured to perform packet processing operations, which includes routing and forwarding decisions for ingress data, as part of the user datapath described herein. When kernel program 68, based on hook point 66, transfers the above packet to user space 62A, that transfer causes execution of the packet processing operations of user module 64. Hence, user module 64 may be executed once per packet or per flow of packets according to some examples. After determining a verdict for each packet, user module 64 either transfers the packet to network interface 61B for transmission to a next hop or to an application for consumption in user space 62A. Instead of returning the packet to the network driver and/or to the networking stack in kernel space 62B, user module 64 arranges an outgoing transmission of the packet by directly passing the packet to network interface 61B. This is a departure from XDP in other devices, which is not used for egress traffic. Furthermore, by handling packet reception and packet transmission, the user datapath may operate a full packet processing datapath, in some instances, as a replacement for the kernel datapath.

In some examples, code point 70 is configured to bind network interface 61B to socket 74 in user module 64. Code point 70 enables user module 64 to directly transfer the packet to network interface 61B for outbound transmission. As an example, user module 64 may be operative to open both socket 72 and socket 74 as AF_XDP sockets, enabling user module 64 to access packets of ingress data directly from network interface 61A and transmit packets of egress data directly to network interface 61B.

In some examples, user module 64 may avail additional modules to support/enhance the packet processing operations. User module 64 may invoke additional packet processing libraries, such as Data Plane Development Kit (DPDK) and Vector Packet Processing (VPP), to support socket 72 and socket 74. For example, user module 64 may invoke a packet buffer allocator that tracks which packet buffer areas are in flight and which ones are free. User module 64 may invoke a library (e.g., libbpf) of helper functions that user module 64 may utilize to facilitate routing and forwarding. Kernel program 68 may generate an interface for user module 64 to call helper functions in kernel space 62B. For example, a helper function may be configured to initialize socket 72 and socket 74 as AF_XDP sockets by registering, for each socket, a packet buffer region (e.g., in memory areas) where packets will be located and creating/binding each socket to a different network interface 61. The packet buffer regions may include shared memory areas between kernel space 62B and user space 62A. As an alternative, Socket 72 may be bound to a same network interface 61 than socket 74.

Examples of applications that provide additional functionality to user module 64 for use in enhanced packet processing include online Deep Packet Inspection (DPI) for supporting a networking layer 7 firewall (IDS/IPS), signature and protocol anomaly checks, handling application-level gateway support, such as for File Transfer Protocol (FTP) and Session Initiation Protocol (SIP), among others. By performing these packet processing operations in user space 62A, the risk to kernel health is significantly reduced as well as avoiding significant effort to get the supporting code into the kernel code base. The dual datapath implementation also avoids degradation of the kernel datapath, for example, regarding forwarding performance (e.g., for the most common forwarding cases).

In some example, device 60 may handle incoming/outgoing packets via the dual datapath implementation by having the network driver configure kernel program 64 to designate flows (e.g., permanently or transiently) in the kernel datapath (e.g., eBPF XDP datapath) to always traverse the user datapath (e.g., AF_XDP socket datapath) to be forwarded/filtered. This can be done selectively, including sampling each flow over time in an iterative manner and/or checking some of the initial packets. By following the user datapath, these flows can be subjected to enhanced processing given that user space 61A is a computing environment on which any application can run.

In the example illustrated in FIG. 4A, kernel program 68 may be bound to network interfaces 61A-61B as a set that, together, have a network interface driver to manage packet transmission and packet reception at any of these interfaces. In some examples, additional network interfaces in device 60 may be bound to kernel program 68 or another kernel program instance that exists in kernel space 62B. Based on a number of factors, kernel program 68 may bind itself to network interface 61A and/or network interface 61B based on which the program has their packets received and/or transmitted.

In some example, the driver running in kernel space 62B may attach kernel program 68 to an ingress interface for network interface 61A (e.g., a port). Executing kernel program 68 at hook point 66 may cause user module 64 to bind socket 72 to a (shared) memory area in kernel space 62B, ultimately connecting user module 64 to the ingress interface of the driver for inbound communications (e.g., packet reception). For outbound communications (e.g., packet transmission), the driver may attach software code in kernel space 62B to an egress interface for network interface 61B. The attached software code may be kernel program 68, another kernel program, or pre-existing functionality in the driver itself. Executing user module 64 may bind socket 74 to the same shared memory area or another memory area in kernel space 62B, ultimately connecting user module 64 to the egress interface of the driver to enable (e.g., packet) forwarding from user space 62A.

Incoming packets may be received by network interface 61A and the ingress interface of the network interface driver may place those packets (e.g., on a kernel datapath) within kernel space 62B, for example, in a memory area that kernel program 68 is to share with user module 64. By way of hook point 66 and socket 72, kernel program 68 may transfer the incoming packets to user module 64 (e.g., and a user datapath) via the shared memory space between user space 62A and kernel space 62B. For example, the driver may designate the above memory area to be shared memory space, create new shared memory space, and/or store the incoming packets in an existing shared memory space. Having access to the incoming packets in the shared memory space, user module 64 invokes various functionality from one or both of user space 62A and kernel space 62B. In this manner, user module 64 may control performance of packet processing operations on the user datapath, and depending on which operating system implementation embodies the driver, the user module 64 is able to bypass a networking stack in kernel space 62B or an equivalent set of programs as part of the kernel datapath.

FIG. 4A also illustrates an example where the dual datapath implementation is applied to ingress data comprising one or more packets of a same flow. At operation 76, ingress data from network interface 61A are received in the registered packet area for socket 72, prompting, at operation 78, hook point 66 to transfers the ingress data to user module 64 via kernel program 68. At operation 80, user module 64 performs appropriate packet processing operations on the ingress data. After user module 64 identifies a network device as a next hop for forwarding the ingress data as egress data, operation 82 occurs where user module 64 transfers, via socket 74, packets of the egress data to the registered packet area of code point 70. At operation 84, the packets of the egress data sent to this packet area may be transmitted by network interface 61B given that code point 70 is bound to network interface 61B. Depending on which operating system provides kernel space 62B, there are other examples of code point 70 for socket 74 to use. In this manner, socket 72 and socket 74 are interfaces between user module 64 and kernel space 62B, and incoming packets of any given flow may be allowed to bypass a networking stack in kernel space 62B and instead, rely on user module 64 for routing and forwarding decisions.

Figure 4B:
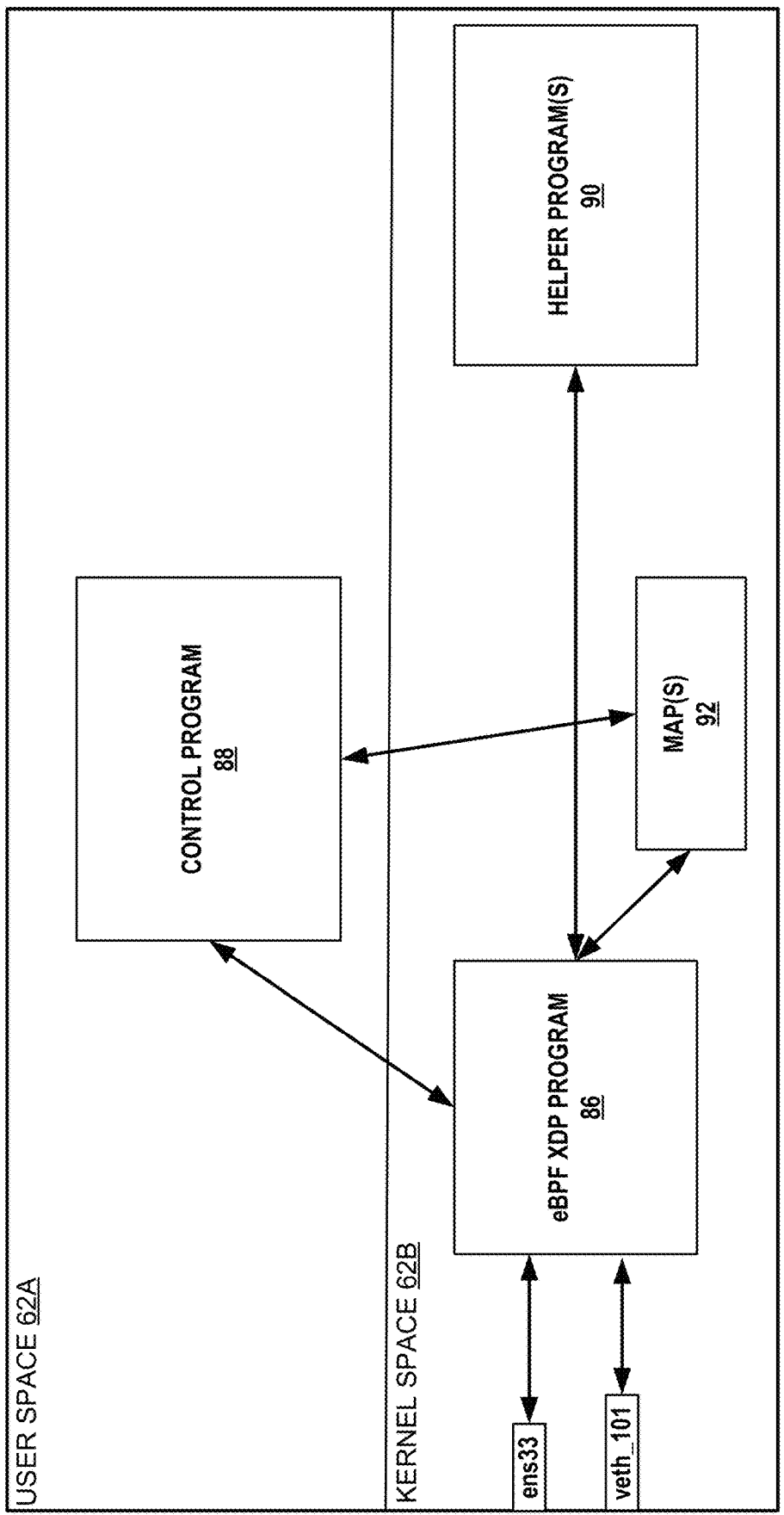
FIG. 4B is a block diagram illustrating an example architecture for the example dual datapath implementation of FIG. 4A in further detail.

FIG. 4B is a block diagram illustrating an example architecture for the example dual datapath implementation of FIG. 4A according to techniques described herein.

As described herein, eBPF XDP program 86 refers to extended Berkeley Packet Filter (eBPF) software code configured to run in a virtual machine at an eXpress data path (XDP) hook point between kernel space 62B and user space 62A. The virtual machine for eBPF may run other programs injected to/from user space 62A and may be coupled to other hooks in the kernel space 62B (e.g., traffic control or connection tracking). In general, eBPF XDP program 86 may be configured to classify, forward, and/or filter packets of a same flow shortly after a network interface card (NIC) offloads the packets into a driver in kernel space 62B (e.g., and prior to routing/forwarding decision).

In some examples, when the ingress data reaches the XDP hook point, eBPF XDP program 86 is executed and loaded into user space 62A. Control program 88 loads the executed eBPF XDP program 86 and allows that program to perform one or more packet processing operations. Control program 88 may be configured to enable additional functionality for eBPF XDP program 86. In some examples, eBPF XDP program 86 sends requests to kernel space 62B on behalf of control program 88.

Control program 88 may use eBPF XDP program 86 to bind logical components (e.g., sockets) in user space 62A to network interfaces (e.g., virtual network interfaces in software or physical network interfaces in hardware). In this manner, specific code sections in control program 88 may inject outgoing packets into an appropriate memory buffer area for an appropriate network interface. Headers of the outgoing packets include information directing their transmission to a next hop determined by control program 88.

Control program 88 may use functionality enabled by eBPF XDP program 86 to send and receive data with programs in kernel space 62B. Control program 88 may use eBPF XDP program 86 to create, configure, and/or read map entries in the virtual machine for eBPF. These map entries may be configured to maintain a current state of invocations of eBPF program 86 by control program 88 or another user space 62A program. Maps 92 refers a memory area for storing the map entries as key/value pairs and enables data sharing between eBPF program 86 and programs in either user space 62A or kernel space 62B. The map entries correspond to shared memory areas where packet buffers enable transfers of packet data between user space 62A and kernel space 62B.

Control program 88 and the programs in kernel space 62B communicate via eBPF XDP program 86 and rely on maps 92 to maintain a state of those communications. This includes communications with helper programs 90, which are Application Programming Interfaces (APIs) to interact with eBPF XDP program 86. In some examples, eBPF XDP program 86 may be limited to those APIs while in other examples, eBPF XDP program 86 may access programs other those APIs. In some examples, eBPF XDP program 86 may access programs that are not part of the eBPF virtual machine.

Control program 88 may receive ingress data received from eBPF XDP program 86 (e.g., via an AF ADP socket)

and also perform one or more packet processing operations on the ingress data. These operations may constitute a user datapath for a dual datapath implementation. The other datapath is a kernel datapath, which is pursued by packets directed to a networking stack. Some packet processing operations include routing and forwarding decisions, such as determining a next hop for (e.g., packets of) the ingress data. In some examples, control program 88 may perform packet filtering operations, for example, to determine whether the ingress data is a security risk. At an end of the user datapath, control program 88 may transform the ingress data into egress data by encapsulating packets of the ingress data with updated header information. The updated header information may include data (e.g., a destination address) for the next hop.

Control program 88 may conclude the user datapath by the transferring the egress data to the next hop via a network interface. Control program 88 may invoke functionality on eBPF XDP program 86 and/or a helper program 90 to facilitate the transfer of the egress data to a memory buffer area for the network interface and record an appropriate map entry in map(s) 92. A socket (e.g., an AF ADP socket) may facilitate the invocation of eBPF XDP program 86 and/or a helper program 90.

By default, the operating system of device 60 may allocate devices names "ens33" and "veth" to the network interfaces. The network interface "ens33" may refer to a (e.g., first) physical Network Interface Card (e.g., Ethernet card) in device 60, similar to device name "eth0" of FIG. 5. The network interface "ens33" may connect device 60 to a network device of a physical network.

In contrast, the network interface "veth" may refer to a virtual network interface, virtual NIC (e.g., virtual Ethernet device), built on a physical NIC for putting packets on the wire. In some examples, the network interface "veth" is a local Ethernet tunnel between virtual machines in device 60. The network interface "veth" may operate tunnels between network namespaces to create a bridge to a network device (e.g., a physical network device or a virtual network device) in another namespace (e.g., another virtual machine in a same host device or a different host device). For the virtual network interface "veth" to work, one end of the tunnel must be bridged with another network interface. In other examples, the network interface "veth" may be used as a standalone network device.

Packets of ingress data received via "veth" interface may be directed to a destination virtual machine in device 60 or in another network device. These packets may include virtual network identifiers for a network driver in device 60 to use in identifying an appropriate virtual network. The virtual network identifiers may include, for example, MPLS labels each associated with a different overlay network.

In some examples, any packet directed to destination on a virtual network via "veth" interface bypasses an operating system networking stack in the kernel space 62B and either progresses along the user datapath or is redirected for outbound transmission via a physical network interface. In other examples, any packet directed to destination on a virtual network via "veth" interface proceeds along kernel datapath to the operating system networking stack for encapsulation into an outgoing packet or for consumption by an application and/or a virtual machine.

In some examples, device 60 may operate in veth-based datapath mode which allows for more flexibility in that all eBPF programs are managed out of a host network namespace such that containers can be granted privileges for their namespaces without affecting security since eBPF enforcement points in the host are unreachable for the container.

An appropriate network driver loads eBPF XDP program 86 into kernel space 62B and then, binds that program to least one network interface. In some examples, both network interfaces "ens33" and "veth-01" may be bound as a set to one kernel program that exists within kernel space 62B while another kernel program is bound to a set of different network interfaces. A network driver for the entire set loads the kernel program into kernel space 62B and then, binds that program to least one network interface "ens33" or "veth-01". Hence, eBPF XDP program 86 may be bound to veth 101 and ens33. As an alternative, eBPF XDP program 86 may be bound to veth 101 but not ens33 or vice versa. As an option, another kernel program may be bound to whichever network interface is not bound to eBPF XDP program 86. In some examples, additional network interfaces in device 60 may be bound to eBPF XDP program 86.

The following describes examples of multiple datapaths operating in concert from kernel space 62B and user space 62A, respectively. When an incoming packet of a flow arrives at network interface "ens33", a network driver of the operating system may place the incoming packet onto the kernel datapath and then, execute eBPF XDP program 86 to either direct the incoming packet to the user datapath or resume the kernel datapath. For eBPF XDP (kernel) program 86, the operating system may employ any one of a number of mechanisms for transferring the packet data stored in a memory area of kernel space 62B to user space 62A. One example mechanism effectuates the packet data transfer for eBPF XDP (kernel) program 86 by sharing access to the memory area in kernel space 62B (i.e., shared kernel memory area). eBPF XDP program 86 may transfer access to the packet data by generating a logical element, a virtual container, having a mem-mapped address space corresponding back to memory locations in the shared memory area in kernel space 62B. Control program 88 may use map(s) 92 to retrieve specific attributes of the packet data from the shared kernel memory area. For instance, the operating system kernel may generate a memory map that control program 88 can use to translate memory locations of the virtual container into the corresponding memory locations in kernel space 62B. There are a number of alternative mechanisms for the packet data transfer, for example, by storing a packet copy in a memory area of user space 62A, such as a packet buffer of an AF_XDP socket interface.

In one example, eBPF XDP (kernel) program 86 parses the incoming packet until reaching networking layer 4 (L4) and then, transfers the packet data to control program 88 where the packet is further parsed in user space 62A. For networking layer 3 (L3) and/or networking layer 2 (L2), control program 88 may access routing and/or forwarding information to determine a next destination for the incoming packet. While not necessary in some examples, control program 88 may invoke helper function(s) 90 for any routing or forwarding decision according to other examples.

The incoming packet may be a first packet of a packet flow (i.e., flow) being routed to device 60 for which the user datapath processes the first packet but may not process subsequent packets. To improve upon the packet processing of the subsequent packets, the kernel datapath may be configured to repeat the forwarding decision for the first packet, for instance, by modifying incoming subsequent packets into outgoing packets and then, outputting the outgoing packets to the next destination of the first packet. In this manner, eBPF XDP program 86 may divert the subsequent packets to the kernel datapath for packet transmission and away from the user datapath where packet processing operations are unnecessarily repeated. For example, control program 88 may return the forwarding information identifying the next destination and in turn, eBPF XDP program 86 may store the forwarding information identifying the next destination in the shared kernel memory area. eBPF XDP program 86 may re-use the forwarding information to achieve a reduction for the subsequent packets in a total amount of time between packet reception and packet transmission (e.g., the amount of time for packet processing). For example, eBPF XDP program 86 may program the next destination into (e.g., logic for) the kernel datapath, causing the automatically packet transmission of each subsequent packet.

After control program 88 parses the first incoming packet of the flow, eBPF XDP program 86 and/or control program 88 may use the forwarding information to generate a context indicative of the next destination of the subsequent packets of the flow. Control program 88 may program the flow context into memory comprising eBPF XDP program 86. In addition to the next destination, control program 88 may program various other data into software code for eBPF XDP program 86, examples of which include additional context data to be passed to control program 88 for use in forwarding the subsequent packets. An example of the additional (flow) context data to be passed to control program 88 may include one or more labels. Control program 88 may generate labels for narrowing down the type of packet processing needed in user space 62A, such as combining L3 and L4 context for specific forwarding treatment and/or verifying that a next L7 state is as expected and/or for specific Quality of Service (QoS) treatment of the packet. Kernel program 86 may transfer the programmed label(s) along with the packet being shared between kernel space 62B to user space 62A.

Control program 88 may invoke functionality of the AF_XDP socket interface to return the forwarding information for storage in the shared kernel memory area. For example, eBPF XDP program 86 may configure a second AF_XDP socket interface to operate as an egress for outgoing packets of the same flow and then, designate the shared kernel memory area as a packet buffer for both the first AF_XDP socket interface and the second AF_XDP socket interface, for example, by modifying the subsequent packets to encapsulate the next destination in the packet header and arranging the modified packets along a contiguous memory block. By doing so, eBPF XDP program 86 may leverage the packet buffer to speed up packet processing. In addition to flow context, control program 88 may return policy information including an instruction to change a specific policy on flows to eBPF XDP program 86. Control program 88 may program the policy change into the memory for eBPF XDP program 86.

Figure 5:
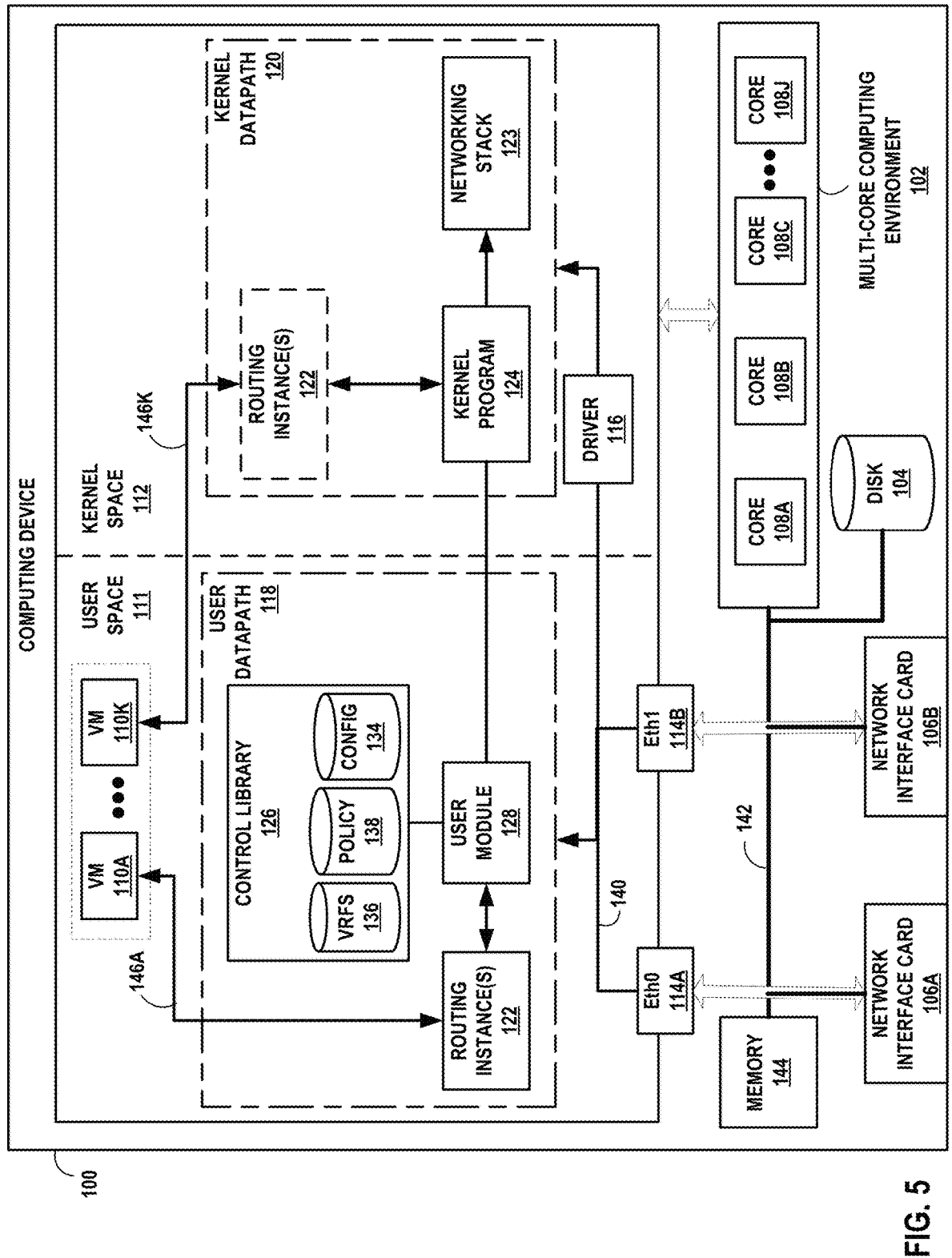
FIG. 5 is a block diagram illustrating an example multi-core computing environment for a server in the software defined network of FIG. 3 according to techniques described herein.

FIG. 5 is a block diagram illustrating computing device 100 that executes an example network device according to techniques described herein. Computing device 100 is a physical computer that operates (in part) as a type of the example network device and includes a software-based implementation of at least one internal datapath for packet processing in user space 111 or both user space 111 and kernel space 112. User datapath 118, an example internal datapath, includes user module 128 as a suitable control program running in user space 111 for executing other software programs in the datapath. User module 128 of FIG. 5 is an example of user module 64 of FIGS. 4A-4B. There are a number of examples for kernel program 124 of FIG. 5, including one or more eBPF programs running in the XDP sub-subsystem (e.g., virtual machine) under a Linux Kernel, among others. Computing device 100 may represent any of servers 12 of FIGS. 1-2 or other devices, such as any of TOR switches 16.

In the example approach of FIG. 5, computing device 100 includes a system bus 142 coupling hardware components of a computing device 100 hardware environment. System bus 142 couples memory 144, network interface cards (NICs) 106A-106B (collectively, "NICs 106"), storage disk 104, and multi-core computing environment 102 having a plurality of processing cores 108A-108J (collectively, "processing cores 108"). Network interface cards 106 include network interfaces configured to exchange packets using links of an underlying physical network. Multi-core computing environment 102 may include any number of processors and any number of hardware cores from, for example, four to thousands. Each of processing cores 108 each includes an independent execution unit to perform instructions that conform to an instruction set architecture for the core. Processing cores 108 may each be implemented as separate integrated circuits (ICs) or may be combined within one or more multi-core processors (or "many-core" processors) that are each implemented using a single IC (i.e., a chip multiprocessor).

Disk 104 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium that can be used to store the desired information and that can be accessed by cores 108.

Memory 144 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Memory 144 provides a physical address space composed of addressable memory locations.

Memory 144 may in some examples present a non-uniform memory access (NUMA) architecture to multi-core computing environment 102. That is, cores 108 may not have equal memory access time to the various storage media that constitute memory 144. Cores 108 may be configured in some instances to use the portions of memory 144 that offer the lowest memory latency for the cores to reduce overall memory latency.

In some instances, a physical address space for a computer-readable storage medium may be shared among one or more cores 108 (i.e., a shared memory). For example, cores 108A, 108B may be connected via a memory bus (not shown) to one or more DRAM packages, modules, and/or chips (also not shown) that present a physical address space accessible by cores 108A, 108B. While this physical address space may offer the lowest memory access time to cores 108A, 108B of any of portions of memory 144, at least some of the remaining portions of memory 144 may be directly accessible to cores 108A, 108B. One or more of cores 108 may also include an L1/L2/L3 cache or a combination thereof. The respective caches for cores 108 offer the lowest-latency memory access of any of storage media for the cores 108.

Memory 144, network interface cards (NICs) 106A-106B (collectively, "NICs 106"), storage disk 104, and multi-core computing environment 102 provide an operating environment for a software stack that executes a dual datapath implementation (e.g., of a network device) and one or more virtual machines 110A-110K (collectively, "virtual machines 110") connected through tap interfaces 146A-146K (collectively, "tap interfaces 146") to routing instances 122 shared amongst user datapath 118 and kernel datapath 120 of the dual datapath implementation.

Virtual machines 110 may represent example instances of any of virtual machines 36 of FIG. 2. The computing device 100 partitions the virtual and/or physical address space provided by main memory 144 and in the case of virtual memory by disk 104 into user space 111, allocated for running user processes, and kernel space 112, which is protected and generally inaccessible by user processes. Memory 144, network interface cards (NICs) 106A-106B (collectively, "NICs 106"), storage disk 104, and multi-core computing environment 102 may also provide an operating environment for an operating system kernel executing in kernel space 112. The operating system kernel may include, for example, a Linux, Berkeley Software Distribution (BSD), another Unix-variant kernel, or a Windows server operating system kernel, available from Microsoft Corp. The operating system kernel may arrange, into a stack for user datapath 118, software code for enhanced packet processing operations. The present disclosure defines "enhanced" packet processing as any operation for packet data that transcends the conventional packet processing operations available from kernel space 112. At least a portion of the software code for the stack may be selected from control library 126 as shown in FIG. 5. For kernel datapath 120, the operating system kernel may arrange, into a stack represented in FIG. 5 as networking stack 123 in kernel space 112, kernel programs for network functions or services. While networking stack 123 is capable of resolving a routing/forwarding decision, none of the kernel programs in networking stack 123 are configured to perform enhanced packet processing, such as Deep Packet Inspection, The operating system kernel may configure driver 116 as network device driver used to connect containers (e.g., physical devices or virtual containers) for the exchange of data. In one example approach, driver 116 is configured to transfer data between eth0 114A, the first network interface (e.g., ens33 of FIG. 4B), and host OS networking stack 123.

In another example approach, driver 116 is configured to transfer data between eth0 114A, the first network interface (e.g., ens33 of FIG. 4B), and user module 128, which may run a separate networking software stack. One example technical advantage of this approach is that, since in some example approaches, kernel program 124 is executed in kernel space 112 and loaded into user space 111 by user module 128 of the same device, packets may be sent as a simple pointer to the shared address space used to store the packets being transferred.

For example, as further described, operating system (OS) networking stack 123 may represent a software network stack executing in kernel space 112 for kernel datapath 120 while user module 128 may implement its own corresponding software network stack, where each network stack implements corresponding functionality for network layers (e.g., layers 1-3 of the OSI model). In some examples, a hook point of driver 116 may be configured to uniquely utilize kernel program 124 to transfer packets to (e.g., share packets with) a software stack operating within user space 111 as user module 128. In some examples, a code point binds user module 128 to an egress of driver 116 for the network interface card, such as eth0 114A for network interface card 106A, to (directly) transmit outgoing packets from user datapath 118. Otherwise, operating system networking stack 123 handles packet transport within kernel space 112 of the computing device 100.

In one example approach, packets of ingress data received from a physical network first pass through driver 116. If certain header types (such as MPLS headers) are detected, the packets are hooked (e.g., by user module 128) and routed up a network stack in user datapath 118. Otherwise, the packets are sent up the (e.g., host) OS networking stack 123 of kernel datapath 120 or transferred to a destination VM 110. In another example approach, driver 116 may pass up through OS networking stack 123 any packet received from a physical network address and directed to a virtual network address.

User datapath 118 and, as an option, kernel datapath 120 include multiple routing instances 122 for corresponding virtual networks. Each routing instance 122 includes a forwarding information base (FIBs) and a flow table. Entries for respective flow tables are identifiable by a virtual network identifier (e.g., a VRF identifier such as VxLAN tag or MPLS label)). FIBs may include lookup tables that map destination addresses to destination next hops. The destination addresses may include layer 3 network prefixes or layer 2 MAC addresses. Flow tables may enable application of forwarding policies to flows. Each of flow tables includes flow table entries that each match one or more flows that may traverse user datapath 118 and include a forwarding policy for application to matching flows. For instance, in one example approach, user datapath 118 attempts to match packets processed by routing instance 122 to one of the flow table entries of a corresponding flow table. If, in this example, a matching flow table entry exists for a given packet in flow table, user datapath 118 applies the flow actions specified in a policy to the packet. This may be referred to as "fast-path" packet processing. If a matching flow table entry does not exist for the packet in the corresponding flow table, the packet may represent an initial packet for a new packet flow and user datapath 118 may request control library 126 to install a flow table entry in flow table for the new packet flow via link 140. This may be referred to as "slow-path" packet processing for initial packets of packet flows.

Compared to other implementations, user datapath 118 may be considered a virtual router where user module 128 executes the "forwarding plane" or packet forwarding functionality and control library 126 executes "control plane" functionality. As an option, kernel program 124 in kernel space 112 may execute the "forwarding plane" or packet forwarding functionality for packets of certain flows. Control library 126 may also provide the "control plane" functionality for kernel program 124. In this manner, kernel datapath 120 includes a separate router for a portion of routing instances 122. Control library 126 may operate as an agent for each datapath (e.g., router) and represent an example instance of any of VN agents 35 of FIG. 2.

In one example approach, control library 126 is a user space 111 process executed by computing device 100. Control library 126 includes configuration data 134, virtual routing and forwarding instances configurations 136 ("VRFs 136"), and policy table 138 ("policies 138"). Control library 126 exchanges control information with one or more virtual network controllers (e.g., VNC 22 of FIGS. 1-2). Control information may include, virtual network routes, low-level configuration state such as routing instances and forwarding policy for installation to configuration data 134, VRFs 136, and policies 138. Control library 126 may also generate reports on various analytics (e.g., device state), install forwarding state to Ms of user datapath 118, discover VMs 110 and attributes thereof. As noted above, control library 126 further applies slow-path packet processing for the first (initial) packet of each new flow traversing forwarding plane 128 and installs corresponding flow entries to flow tables for the new flows for fast path processing by user datapath 118 for subsequent packets of the flows.

Computing device 100 may in some instances execute a hypervisor to manage virtual machines 110 (not shown in FIG. 3). An example hypervisor 31 is illustrated in FIG. 2. Example hypervisors include Kernel-based Virtual Machine (KVM) for the Linux kernel, Xen, ESXi available from VMware, Windows Hyper-V available from Microsoft, and other open-source and proprietary hypervisors. In some examples, specialized hardware programmed with routing information such as FIBS 124 may execute user datapath 118 and/or kernel datapath 120.

Eth0 114A and Eth1 114B represent devices according to a software device model and provide device driver software routines for handling packets for receipt/transmission by corresponding NICs 106. Packets received by NICs 106 from the underlying physical network fabric for the virtual networks may include an outer header to allow the physical network fabric to tunnel the payload or "inner packet" to a physical network address for one of NICs 106. The outer header may include not only the physical network address but also a virtual network identifier such as a VxLAN tag or Multiprotocol Label Switching (MPLS) label that identifies one of the virtual networks as well as the corresponding routing instance 122. An inner packet includes an inner header having a destination network address that conform to the virtual network addressing space for the virtual network identified by the virtual network identifier.

For example, user module 128 may receive by Eth1 114B from NIC 106 a packet having an outer header than includes a VxLAN associated that user datapath 118 associates with routing instance 122. The packet may have an inner header having a destination network address that is a destination address of VM 110A that taps, via tap interface 146A, into routing instance 122. Alternatively, kernel datapath 120 may associate the VxLAN with routing instance 122.

Figure 6:
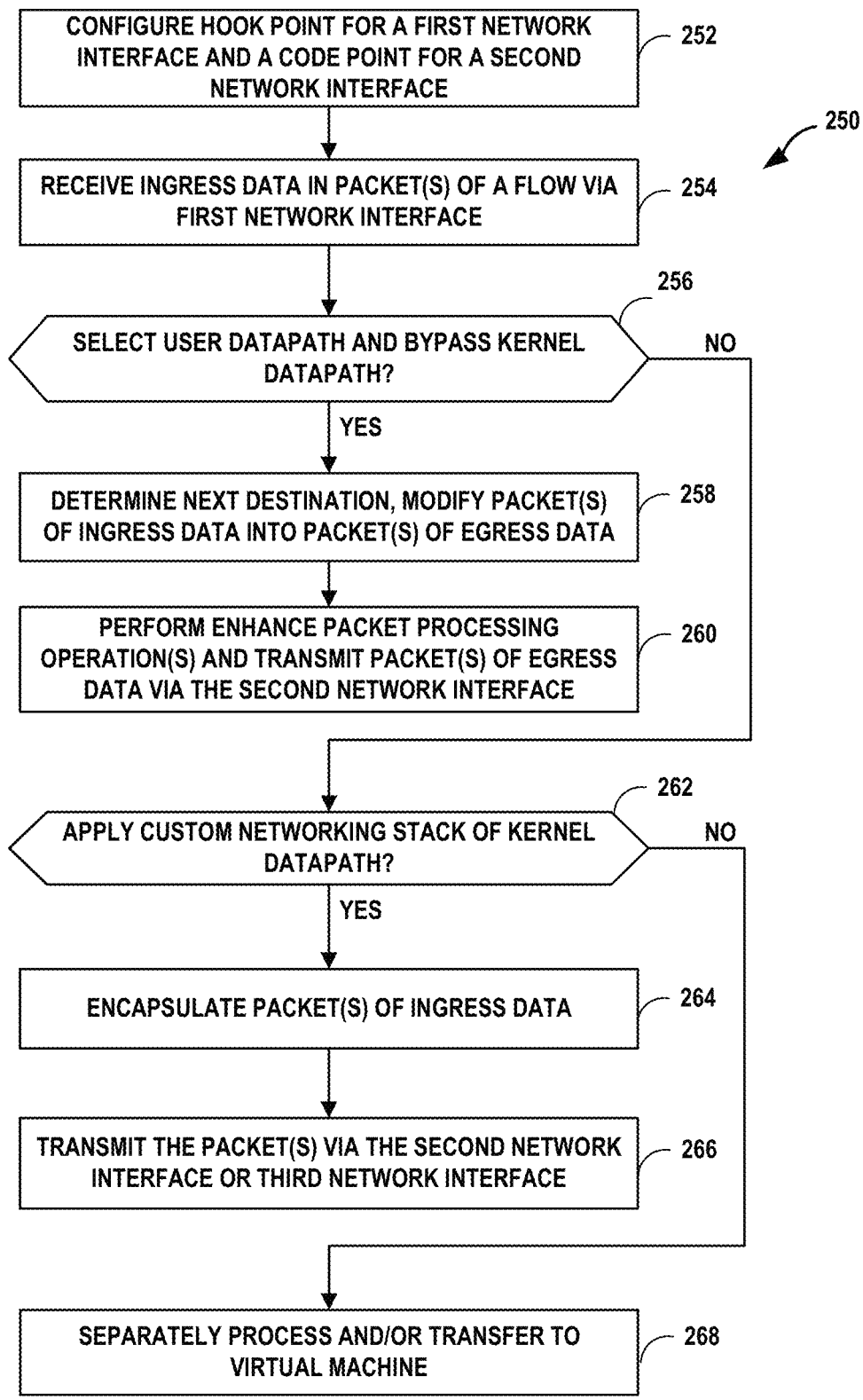
FIG. 6 is a flowchart illustrating an example mode of operation where a user application controls routing and forwarding of ingress and egress data according to techniques described herein.

FIG. 6 is a flowchart illustrating an example mode of operation 250 of a computing device for receiving ingress data and processing egress data in a user datapath, in accordance with techniques described herein.

The present disclosure described the user datapath as being based in software and/or hardware. To illustrate by way of example, a hardware-based implementation of the user datapath may include a hardware unit having forwarding hardware (e.g., forwarding or data plane) and control hardware (e.g., control plane). In the above hardware unit, "hardware" refers to respective ASICs programmed with logic for one or more functions but any form of logic executable by processing circuitry (e.g., logic circuitry) may be used for the forwarding hardware and/or the control hardware.

The example mode of operation 250 may be described with respect to computing device 100 of FIG. 5, particularly user datapath 118, an example software-based implementation of the user datapath for a network device. It should be noted that any type of network device may operate in accordance with the illustrated example of FIG. 6. The example mode of operation 250 is directed to an operating system of computing device 100 of FIG. 5 and a number of components thereof for enabling user space packet processing (e.g., routing and forwarding) in user datapath 118 as opposed to a kernel datapath of which driver 116 of FIG. 5 or another network driver is one example.

Driver 116 configures a hook point for a first network interface and a code point for a second network interface (252). The first network interface and the second network interface may be referred to an ingress network interface and an egress network interface, respectively. Driver 116 configures kernel program 124 for execution at the hook point as described herein. The hook point (e.g., hook point 66 of FIG. 4A) may be a pre-routing hook with executable code coupled to a position within software code for driver 116. The hook point may couple the kernel program 124 to the first network interface such that an incoming packet initiates kernel datapath 120 for packet processing. Data programmed into the kernel space to represent kernel datapath 120 may be organized into a logical structure indicating an ordering for the execution of a number of computer programs. Assuming that at least part of the logical structure corresponds to a networking model (e.g., a 7-layer networking model), an execution order for the kernel datapath follow the ordering of networking layers in the model. For instance, a (e.g., virtual/physical) network interface card (NIC) configured with sufficient hardware/software for executing functionalities of a link layer and a data layer may generate the first network interface as an ingress network interface. The first network interface may represent a physical or virtual port of the NIC to kernel datapath 120.

In some examples, driver 116 may configure kernel program 124 for execution, for example, after packet reception by the first network interface. Driver 116 may load kernel program into user space 111 and initiate an ordering of software programs of user datapath 118. Kernel program 124 may include an eBPF program that is loaded into a container (e.g., a virtual machine) and executed to enabled interaction with user space 111. Kernel program 124 may use driver 116 to configure a pair of ingress and egress interfaces between packet buffers in user space and kernel space, such as a pair of AF_XDP socket interfaces pointing to (e.g., shared) kernel space memory areas allocated for user datapath 118 where a first socket interface is coupled to a code point in driver 116 for packet reception from the first network interface and a second socket interface is coupled to a code point in driver 116 for packet transmission to the second network interface.

One or both of the above socket interfaces enable user module 128 to read data from/write data to the kernel space memory areas, possibly in communication with kernel program 124, driver 116, or another kernel program. Upon packet reception, driver 116 transfers, via the first socket interface, incoming packets of ingress data from a memory buffer in the first network interface to shared kernel space memory areas between kernel program 124 and user module 128. Upon packet transmission, driver 116 transfers, via the second socket interface, outgoing packets of egress data from the shared kernel space memory areas to a memory buffer in the second network interface.

In some examples, when packet(s) arrives via the first network interface, at least one packet is hooked, at hook point, to kernel program 124 for processing. Driver 116 may transfer, into the kernel space memory areas, packet data received via the first network interface, causing the packet data to reach the above hook point, and execution of kernel program 124 and, possibly, user module 128 for packet processing. Driver 116 may execute kernel program 124, at the hook point, to transfer the packet data into the user space memory areas for user module 124 to process. In effect, kernel program 124 is coupling the first network interface, via the hook point, with the first socket interface to user module 128 of user datapath 118. In one example approach, policies defined when provisioning user datapath may control whether or not to process, in user space 111, a given packet received from a network device. For instance, driver 116 may have been configured to bypass the OS networking stack when a destination address matches certain predefined IP addresses.

Driver 116 receives ingress data in a number of (incoming) packets via the first network interface (254). The incoming packets of the ingress data may correspond to a same flow. Driver 116 may select between user datapath 118 or kernel datapath 120 for processing the packet(s) of the ingress data (256). Driver 116 may select user datapath 118 for the packet(s) of the ingress data and proceed to bypass kernel datapath 120 in favor of user module 128 (YES of 256). Bypassing kernel datapath 120 may include bypassing operating system (OS) networking stack 123. Driver 116 executes kernel program 124 in a virtual machine associated with the hook point, which causes execution of user module 128 of user datapath 118. Via the first socket interface, user module 128 receives the ingress data from kernel program 124 in response to the ingress data triggering the hook point.

As described herein, proceeding along user datapath 118 causes user module 128 to perform enhanced packet processing operations in user space 111. Packet processing, at the very least, includes path determination operations such as routing and forwarding decisions for the packets (e.g., of a same flow). Driver 116 may consult a policy governing which packets are processed along user datapath 118 and which packets are processed along kernel datapath 120. User module 128 determines a next hop as a destination for the ingress data and then, modifies packet(s) of the ingress data into packet(s) of egress data for the same flow (258). The egress data includes new header information for these packet (s). User module 128 binds the second socket interface with the code point (e.g., of an egress network driver) to enable the transfer of the egress data to the second network interface. The second network interface is operative to transmit the egress data to a destination network device corresponding to the next hop.

Prior to the packet transmission via the second network interface, user module 128 may invoke functionality (e.g., of a software program) for performing one or more enhanced packet processing operations (260). As described herein for executing user datapath 118, user module 128 may avail a variety of applications configured for enhanced packet processing of which some examples are described as follows. One example application configured for enhanced packet processing may implement online Deep Packet Inspection (DPI)-related functionality. Online DPI may be beneficial when employed in an application that provides L7 firewall (IDS/IPS) support. Another example application for enhanced packet processing may be a security application configured to perform signature and protocol anomaly checks on one or more packets of a same flow. A third example application may be configured to handle application-level gateway support, such as for FTP or SIP; other protocols may benefit, for example, when more complex checks are needed. Offloading the packet processing operations to the user space provides additional benefits and advantages, for example, by significantly reducing the risk to kernel health and avoiding significant costs in resources and time due to moving into a code base within the kernel space, user application software code for enhanced packing processing. This approach also avoids degradation of the kernel forwarding performance, for the most common forwarding cases.

Driver 116 may select kernel datapath 120 over the user datapath 118 and per that selection, proceed along that datapath by transferring the packet(s) of the ingress data to a networking stack or to a destination virtual machine (NO of 256). If driver 116 selects kernel datapath 120, driver 116 may determine whether or not to apply a custom networking stack (262). In some examples, kernel program 124 implements the custom networking stack for packet processing instead of a standard networking stack such as one provided by the operating system for computing device 100. When a packet proceeds along kernel datapath 120, kernel program 124 may run the packet up/down the custom networking stack by incrementally parsing each layer to apply that layer's corresponding software code. The custom networking stack may employ kernel helper functions from kernel space 112. Kernel program 124 may construct the custom networking stack to include software programs that are similar to (e.g., or completely different from) corresponding programs of the standard operating system networking stack. As an alternative, kernel datapath 120 may include the standard networking stack such that, instead of using the custom networking stack, kernel program 124 invokes conventional routing/forwarding functionality of corresponding networking layers.

Based on a determination to apply the custom networking stack (YES of 262), kernel program 124 may invoke an appropriate layer of the custom networking stack to encapsulate packet(s) of egress data (264) followed by an invocation of a next layer of the custom networking stack to transmit the packet(s) of egress data to a network device matching the next destination (266). The encapsulation may be achieved by a software program for modifying the packet(s) of ingress data to indicate the next destination. As described herein, kernel program 124 may parse the packet (s) of the ingress data into layers corresponding to the networking layers of any networking stack. Accordingly, the appropriate layer of the custom networking stack matches a top layer of the parsed packet(s) and corresponds to the aforementioned software program for performing the encapsulation.

Kernel program 128 may prompt the next layer's corresponding software program of the custom networking stack to forward the packets of egress data to a physical network or a virtual network via the second network interface or, alternatively, via a third network interface (266). As an option for certain virtual networks, a destination virtual machine may have a separate (e.g., virtual network interface. For example, driver 116 may decide to apply OS networking stack 123 to generate a tunnel packet for transmission to the virtual network.

Tunnel packets may be processed by a computing device according to techniques described in this disclosure. "Outer" or "tunnel" packet includes outer header and inner or "encapsulated" packet. Outer header may include protocol or type-of-service (TOS) field and public (i.e., switchable by the underling physical network for a virtual network associated with inner packet) IP address information in the form of source IP address field and destination IP address field. Protocol field in this example indicates tunnel packet uses GRE tunnel encapsulation, but other forms of tunnel encapsulation may be used in other cases, including IPinIP, NVGRE, VxLAN, and MPLS over MPLS, for instance.

In one example approach, driver 116 receives an encapsulated packet from the virtual network. The encapsulated packet includes a source address and a destination address. The destination address is associated with a virtual machine executing on computing device 100. Driver 116 inspects the packet, determines that the packet is an ESP packet and forwards the packet to host OS networking stack 123. In one example approach, driver 116 only forwards certain types of packets up the network stack of user module 128. All others, including encapsulated packets, are transferred to the host OS networking stack 123 for processing. Driver 116 retrieves the packets from shared memory areas in kernel space 112 and forwards the packets to the virtual machines associated with the packet destination addresses.

Driver 116 may determine that the ingress data is directed to a destination virtual machine in computing device 100 as an endpoint, and, for at least that reason, the custom networking stack is not to be applied (NO of 262). Instead of the custom networking stack, driver 116 may separately process the ingress data into the egress data using networking stack 123, kernel program 124, and/or another kernel program 124. Driver 116 may then proceed to forward the egress data to the destination virtual machine (268). As an alternative, driver 116 may include programming (e.g., a context) for the next destination of the flow of the ingress data. Driver 116 may advantageously use that programming such as when subsequent packets of the same flow arrive at the first network interface; driver 116 may redirect the subsequent packets to the second network interface.

The techniques described herein, including in the preceding any of sections, may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively, or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random-access memory (RAM), read-only memory (ROM), non-volatile random-access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method for a computing device comprising at least two network interfaces communicatively coupled with at least two network devices, the method comprising:
configuring, in a kernel space of the computing device, a hook point for ingress from a first network interface, wherein the hook point is to couple a kernel program with a first socket accessible by a user module configured to run in user space of the computing device, wherein the first network interface communicatively couples a first network device with the computing device;
configuring, in the kernel space of the computing device, a code point for egress to a second network interface, wherein the code point is to couple the kernel program with a second socket accessible by the user module, wherein the second network interface communicatively couples a second network device with the computing device;
in response to receiving ingress data of a flow from the first network device, executing, by the computing device and based on the hook point, the kernel program to transfer, via the first socket, the ingress data to the user module;
in response to the user module determining the second network device as a next destination for the flow, transferring, via the second socket, egress data of the flow to the code point for the second network interface, wherein the second network interface is operative to output the egress data to the second network device; and
in response to determining the second network device as the next destination for a first packet of the flow, transferring, from an extended Berkeley Packet Filter (eBPF) program running in the kernel space at the hook point for an eXpress datapath (XDP), subsequent packets of the flow to a networking stack in the kernel space.

2. The method of claim 1, wherein configuring the hook point further comprises configuring the eBPF program to run as the kernel program at the hook point.

3. The method of claim 1, wherein configuring the hook point further comprises configuring the eBPF program to run as the kernel program at the hook point for the XDP.

4. The method of claim 1, wherein configuring the hook point further comprises configuring the eBPF program to run as the kernel program at the XDP of a network interface card (NIC).

5. The method of claim 1, wherein configuring the hook point further comprises configuring the eBPF program with a first address-family eXpress datapath (AF_XDP) socket as the first socket and a second AF_XDP socket as the second socket.

6. The method of claim 1, wherein configuring the hook point further comprises configuring a control program to run in user space as the user module and loading the eBPF program to generate a first address-family eXpress datapath (AF_XDP) socket as the first socket and a second AF_XDP socket as the second socket.

7. The method of claim 1, wherein configuring the hook point further comprises configuring a control program to run in user space for the eBPF program running in kernel space, wherein the control program is configured to use the eBPF program to receive, via a first AF_XDP socket, incoming packet data from the first network device and to transmit, via a second AF_XDP socket, outgoing packet data to the second network interface to the second network device.

8. The method of claim 1, wherein configuring the hook point further comprises
configuring, for the eBPF program running in the kernel space, a first address-family eXpress datapath (AF_XDP) socket as the first socket and a second AF_XDP socket as the second socket, wherein the first AF_XDP socket is coupled to a physical network device as the first network device and the second AF_XDP socket is coupled to a virtual network device as the second network device.

9. The method of claim 1, wherein configuring the hook point further comprises:
configuring the kernel program to share, with the user module, a shared kernel space memory area for storing a packet of the ingress data, wherein the user module is configured to perform packet processing on the packet of the ingress data by modifying the ingress data to generate, in the shared kernel space memory area, the egress data for the second network device.

10. A device, comprising:
a first network interface communicatively coupled to a first network device;
a second network interface communicatively coupled to a second network device;
memory; and
a processor connected to the memory and communicably connected to the first network interface and the second network interface, wherein the memory includes instructions that, when executed by the processor, cause the processor to:
in response to receiving ingress data of a flow from the first network device via the first network interface, execute, based on a hook point in kernel space of the device, a kernel program to transfer, via a first socket of a user module, the ingress data for packet processing;
configure a code point in the kernel space for data transmission via the second network interface, wherein the user module is configured to couple a second socket with the code point;
in response to determining the second network device as a next destination for the flow, transfer, via the second socket, egress data of the flow to the code point for the second network interface, wherein the second network interface is operative to output the egress data to the second network device; and
in response to determining the second network device as the next destination for a first packet of the flow, transfer, from an extended Berkeley Packet Filter (eBPF) program running in the kernel space at the hook point for an eXpress datapath (XDP), subsequent packets of the flow to a networking stack in the kernel space.

11. The device of claim 10, wherein the memory further includes instructions that, when executed by the processor, cause the processor to:
configure, in the kernel space, the hook point for the first network interface, wherein the hook point is configured to couple the kernel program with the first socket of the user module running in the device.

12. The device of claim 10, wherein to execute the kernel program, the instructions further cause the processor to:
execute the eBPF program to run as the kernel program at the hook point.

13. The device of claim 10, wherein to execute the kernel program, the instructions further cause the processor to:
configure the eBPF program to run as the kernel program at the hook point for the XDP.

14. The device of claim 10, further comprising a network interface card (NIC), wherein to execute the kernel program, the instructions further cause the processor to:
execute the eBPF program to run as the kernel program at the XDP of the NIC as the first network interface.

15. The device of claim 10, wherein to execute the kernel program, the instructions further cause the processor to:
configure, for the eBPF program running in kernel space, with a first address-family eXpress datapath (AF_XDP) socket as the first socket and a second AF_XDP socket as the second socket.

16. The device of claim 10, wherein to execute the kernel program, the instructions further cause the processor to:
configure, for the eBPF program running in user space, with a first address-family eXpress datapath (AF_XDP) socket as the first socket and a second AF_XDP socket as the second socket, wherein the first AF_XDP socket is coupled to a physical network device as the first network device and the second AF_XDP socket is coupled to a virtual network device as the second network device.

17. A network system comprising:
a switch fabric comprising a plurality of switches interconnected to form a physical network;
a virtual network controller device configured to configure and manage one or more virtual networks within the physical network; and
a plurality of servers interconnected by the switch fabric, wherein each of the servers comprises an operating environment executing one or more virtual machines in communication via virtual routing instances to the one or more virtual networks, wherein each server includes a host operating system (OS) executing in kernel space on the server, wherein a kernel program executes in kernel space and a user module executes in user space on each server in a virtual network stack connected to one or more of the virtual networks, wherein each pair of kernel program and user module is configured to extend the one or more virtual networks to the operating environments of the virtual machines,
wherein a first server of the plurality of servers is operable to:
configure, in the kernel space of the first server, a hook point for a first network interface, wherein the kernel program is configured to couple the hook point with a first socket of a user module of the first server, wherein the first network interface communicatively couples a first network device with the first server;
configure, in the kernel space of the first server, a code point for a second network interface, wherein the user module is configured to couple the code point with a second socket of the user module, wherein the second network interface communicatively couples a second network device with the first server;

in response to receiving ingress data of a flow from the first network device, execute, based on the hook point, the kernel program to transfer, via the first socket, the ingress data to the user module; and in response to determining the second network device as a next hop for the ingress data, transfer, based on the code point, egress data of the flow via the second socket to the second network interface, wherein the second network interface is operative to output the egress data to the second network device; and in response to determining the second network device as the next hop for a first packet of the flow, transfer, from an extended Berkeley Packet Filter (eBPF) program running in the kernel space at the hook point for an eXpress datapath (XDP), subsequent packets of the flow to a networking stack in the kernel space.

18. The network system of claim 17 further comprising a network device comprising:

a hardware unit for forwarding packet data comprising:
  a first network interface card configured for packet reception;
  a second network interface card configured for packet transmission;
  at least one packet processor operably coupled to a memory, executable by processing circuitry, and configured to run in user space; and
  an internal datapath comprising logic to run in the kernel space for transferring incoming packets from the first network interface card to the at least one packet processor, wherein the at least one packet processor comprising logic for determining a next destination for the incoming packets, and further comprising logic to run in the user space for transferring outgoing packets from the at least one packet processor to the second network interface card, wherein at least a portion of the internal datapath is stored to the memory and is executable by the processing circuitry.

* * * * *